(12) United States Patent
Lindsay et al.

(10) Patent No.: US 9,144,882 B2
(45) Date of Patent: Sep. 29, 2015

(54) IDENTIFYING LIQUID JET CUTTING SYSTEM COMPONENTS

(71) Applicant: Hypertherm, Inc., Hanover, NH (US)

(72) Inventors: Jon W. Lindsay, Hanover, NH (US); Cedar J. Vandergon, New Brighton, MN (US); Eric J. Chalmers, Minneapolis, MN (US); Michael Hoffa, Lebanon, NH (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 14/135,714

(22) Filed: Dec. 20, 2013

(65) Prior Publication Data

US 2014/0113527 A1   Apr. 24, 2014

Related U.S. Application Data

(63) Continuation-in-part of application No. 14/075,692, filed on Nov. 8, 2013, which is a continuation-in-part of application No. 13/838,919, filed on Mar. 15, 2013, which is a continuation-in-part of application No. 13/560,059, filed on Jul. 27, 2012, which is a continuation-in-part of application No. 13/439,259, filed on Apr. 4, 2012.

(51) Int. Cl.
*B24B 49/00* (2012.01)
*B24B 49/10* (2006.01)
(Continued)

(52) U.S. Cl.
CPC . *B24B 49/10* (2013.01); *B23K 5/00* (2013.01); *B23K 7/10* (2013.01); *B23K 10/006* (2013.01); *B23K 10/02* (2013.01); *B23K 26/20* (2013.01); *B23K 26/38* (2013.01); *B23K 26/422* (2013.01); *B24C 3/02* (2013.01); *B26D 5/00* (2013.01); *B26F 3/004* (2013.01); *H05H 1/34* (2013.01);
(Continued)

(58) Field of Classification Search
CPC .... B24B 49/16; B24B 37/013; B24B 37/042; B24B 49/12; B24B 49/08
USPC .......... 451/1, 2, 3, 5, 36–40, 75–102; 417/63, 417/151–198; 83/53, 177; 239/71
See application file for complete search history.

(56) References Cited

U.S. PATENT DOCUMENTS 2,985,050 A * 5/1961 Schwacha .................... 83/53
5,018,670 A * 5/1991 Chalmers ..................... 239/433
(Continued)

FOREIGN PATENT DOCUMENTS

CA   2439213      10/2006
EP   0508482 A2   10/1992
(Continued)

OTHER PUBLICATIONS

International Search Report for International Application No. PCT/US2013/021364 dated Jan. 14, 2013 4 pages.
(Continued)

*Primary Examiner* — George Nguyen
(74) *Attorney, Agent, or Firm* — Proskauer Rose LLP

(57) ABSTRACT

A consumable component of a liquid jet cutting system is provided. The consumable component includes a body defining a conduit for a liquid jet and a signal device located on or within the body for transmitting a signal associated with the consumable component to a reader.

28 Claims, 15 Drawing Sheets

(51) Int. Cl.
*B24C 3/02* (2006.01)
*B23K 10/00* (2006.01)
*B23K 10/02* (2006.01)
*H05H 1/34* (2006.01)
*B23K 5/00* (2006.01)
*B23K 7/10* (2006.01)
*B23K 26/20* (2014.01)
*B23K 26/38* (2014.01)
*B23K 26/30* (2014.01)
*B26D 5/00* (2006.01)
*B26F 3/00* (2006.01)

(52) U.S. Cl.
CPC .............. *H05H 2001/3473* (2013.01); *H05H 2001/3494* (2013.01)

(56) References Cited

U.S. PATENT DOCUMENTS

| | | | |
|---|---|---|---|
| 5,086,655 A * | 2/1992 | Fredericks et al. | 73/861.61 |
| 5,309,683 A * | 5/1994 | Hockett | 451/87 |
| 5,388,965 A * | 2/1995 | Fehn | 417/63 |
| 5,390,964 A * | 2/1995 | Gray, Jr. | 285/93 |
| 5,440,477 A | 8/1995 | Rohrberg et al. | |
| 5,500,512 A | 3/1996 | Goldblatt | |
| 5,556,562 A | 9/1996 | Sorenson | |
| 5,653,264 A * | 8/1997 | Atkinson | 138/44 |
| 5,860,849 A * | 1/1999 | Miller | 451/40 |
| 6,133,542 A | 10/2000 | Dvorak et al. | |
| 6,326,583 B1 | 12/2001 | Hardwick et al. | |
| 6,409,476 B2 * | 6/2002 | Mills | 417/18 |
| 6,479,793 B1 | 11/2002 | Wittmann et al. | |
| 6,510,984 B2 | 1/2003 | Blankenship et al. | |
| 6,717,096 B2 | 4/2004 | Hewett et al. | |
| 6,772,040 B1 | 8/2004 | Picard et al. | |
| 6,781,085 B2 | 8/2004 | Ulrich et al. | |
| 6,933,462 B2 | 8/2005 | Iriyama et al. | |
| 6,960,737 B2 | 11/2005 | Tatham | |
| 6,992,262 B2 | 1/2006 | Matus et al. | |
| 6,995,545 B2 | 2/2006 | Tracy et al. | |
| 7,032,814 B2 | 4/2006 | Blankenship | |
| 7,115,833 B2 | 10/2006 | Higgins et al. | |
| 7,186,944 B2 | 3/2007 | Matus et al. | |
| 7,375,302 B2 | 5/2008 | Twarog et al. | |
| 7,411,154 B2 | 8/2008 | Fosbinder et al. | |
| 8,203,095 B2 | 6/2012 | Storm et al. | |
| 8,204,618 B2 | 6/2012 | Young, Jr. et al. | |
| 8,263,896 B2 | 9/2012 | Schneider | |
| 8,278,588 B2 | 10/2012 | Salsich et al. | |
| 8,373,084 B2 | 2/2013 | Salsich | |
| 8,395,076 B2 | 3/2013 | Matus | |
| 8,686,318 B2 | 4/2014 | Albrecht et al. | |
| 8,748,776 B2 | 6/2014 | Albrecht et al. | |
| 8,859,828 B2 | 10/2014 | Liu et al. | |
| 8,859,928 B2 | 10/2014 | Sommerfeld | |
| 2003/0025598 A1 | 2/2003 | Wolf et al. | |
| 2003/0148709 A1 * | 8/2003 | Anand et al. | 451/39 |
| 2005/0109738 A1 | 5/2005 | Hewett et al. | |
| 2007/0012099 A1 * | 1/2007 | Becourt | 73/168 |
| 2007/0051711 A1 | 3/2007 | Kachline | |
| 2007/0080149 A1 | 4/2007 | Albrecht et al. | |
| 2007/0080151 A1 | 4/2007 | Albrecht et al. | |
| 2007/0080152 A1 | 4/2007 | Albrecht et al. | |
| 2007/0080153 A1 | 4/2007 | Albrecht et al. | |
| 2007/0294608 A1 | 12/2007 | Winterhalter et al. | |
| 2008/0011821 A1 * | 1/2008 | Ellender et al. | 235/375 |
| 2008/0061049 A1 | 3/2008 | Albrecht | |
| 2008/0093476 A1 * | 4/2008 | Johnson et al. | 239/72 |
| 2008/0149608 A1 | 6/2008 | Albrecht | |
| 2008/0149686 A1 | 6/2008 | Daniel et al. | |
| 2008/0223952 A1 | 9/2008 | Wernli et al. | |
| 2008/0257874 A1 | 10/2008 | Kaufman et al. | |
| 2009/0008370 A1 | 1/2009 | Salsich et al. | |
| 2009/0159575 A1 | 6/2009 | Salsich | |
| 2009/0163130 A1 * | 6/2009 | Zambergs | 454/71 |
| 2009/0184098 A1 | 7/2009 | Daniel et al. | |
| 2009/0212027 A1 | 8/2009 | Borowy et al. | |
| 2009/0288532 A1 * | 11/2009 | Hashish | 83/53 |
| 2010/0324868 A1 * | 12/2010 | Russell et al. | 703/1 |
| 2011/0000893 A1 | 1/2011 | Blankenship et al. | |
| 2011/0114616 A1 | 5/2011 | Albrecht | |
| 2011/0294401 A1 * | 12/2011 | Habermann et al. | 451/5 |
| 2012/0021676 A1 * | 1/2012 | Schubert et al. | 451/38 |
| 2012/0241428 A1 | 9/2012 | Kowaleski | |
| 2013/0210319 A1 * | 8/2013 | Gramling et al. | 451/2 |
| 2013/0263420 A1 | 10/2013 | Shipulski | |
| 2013/0264317 A1 | 10/2013 | Hoffa et al. | |
| 2013/0264320 A1 | 10/2013 | Shipulski et al. | |
| 2014/0335761 A1 * | 11/2014 | Chou et al. | 451/5 |

FOREIGN PATENT DOCUMENTS

| | | |
|---|---|---|
| EP | 1065620 | 1/2001 |
| EP | 1117279 A1 | 7/2001 |
| EP | 1516688 A1 | 3/2005 |
| EP | 1522371 A1 | 4/2005 |
| JP | S61-63368 | 4/1986 |
| WO | 2008144785 A1 | 12/2008 |
| WO | 2010142858 A1 | 12/2010 |
| WO | 2013000700 A1 | 1/2013 |
| WO | 2013/151602 | 10/2013 |
| WO | 2013/151886 | 10/2013 |

OTHER PUBLICATIONS

International Search Report for International Application No. PCT/US2013/034572 dated Mar. 29, 2013 4 pages.

Torchmate® Arc Voltage Torch Height Control—Operation Manual, Applied Robotics, Inc., Oct. 2005, pp. 1-19.

Trumpf Press Release, New RFID lens provides LensLine sensor system with improved condition checking capabilities, online press release available at http://www.trumpf.com/nc/en/press/press-releases/press-release/rec-uid-266044.html, Aug. 12, 2013. (4 pages).

* cited by examiner

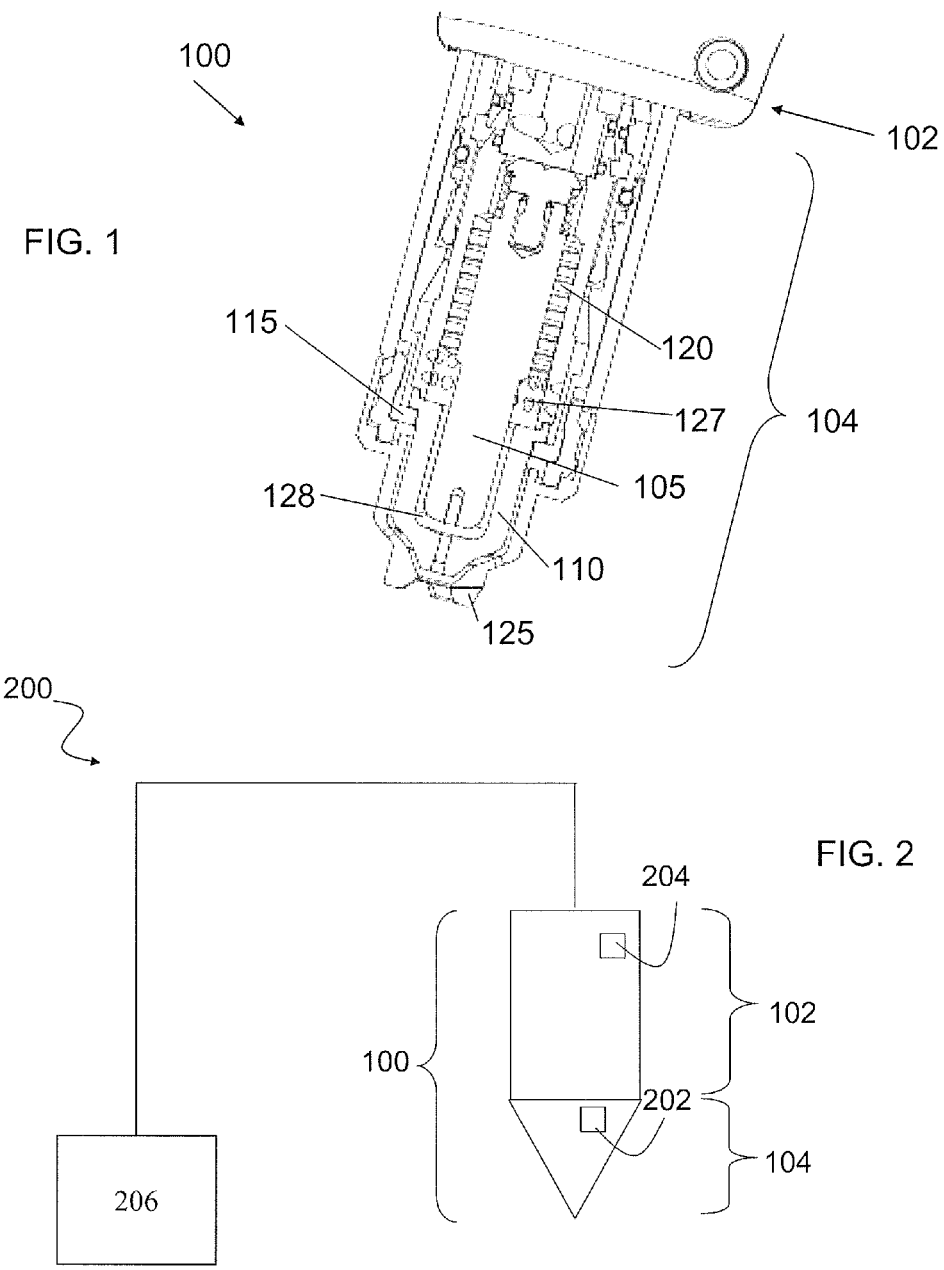

FIG. 12

| Process | Vent Off Valve | Supply Pressure (psig) | Plasma Gas Flow (scfh)* | POV Pressure (psig) | Vent Flow (scfh)** | Plasma Plenum Pressure (psig) |
|---|---|---|---|---|---|---|
| 400A MS | closed | 108.7 | 62.6 | 9.8 | 0 | 4.0 |
|  | open | 109.0 | 62.7 | 9.8 | 11.0 | n/a |
| 260A MS | closed | 108.3 | 59.4 | 21.9 | 0 | 4.0 |
|  | open | 109.1 | 58.8 | 21.6 | 5.5 | n/a |
| 200A MS | closed | 108.7 | 36.0 | 13.0 | 0 | 4.0 |
|  | open | 108.6 | 36.4 | 12.9 | 6.1 | n/a |
| 130A MS | closed | 108.2 | 27.7 | 11.4 | 0 | 4.0 |
|  | open | 108.9 | 27.8 | 11.4 | 3.8 | n/a |
| 80A MS | closed | 109.0 | 11.0 | 8.3 | 0 | 4.0 |
|  | open | 108.8 | 11.0 | 8.2 | 2.8 | n/a |
| 50A MS | closed | 107.5 | 4.7 | 6.7 | 0 | 4.0 |
|  | open | 107.9 | 6.2 | 6.4 | 4.4 | n/a |
| 30A MS | closed | 108.5 | 2.0 | 7.3 | 0 | 4.0 |
|  | open | 109.1 | 2.4 | 7.2 | 3.6 | n/a |

FIG. 15
FIG. 16a
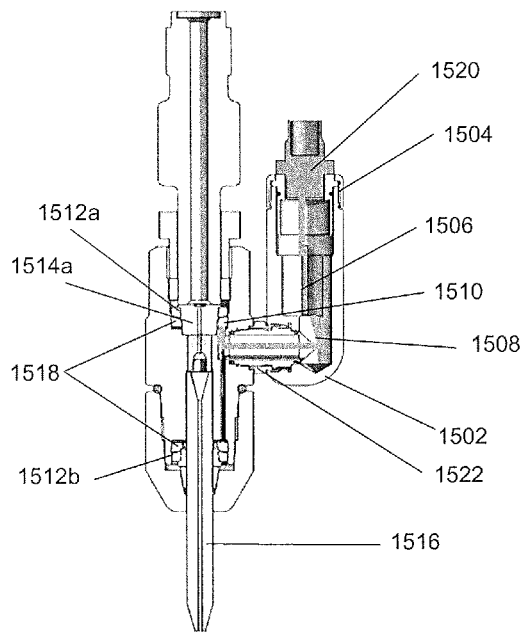
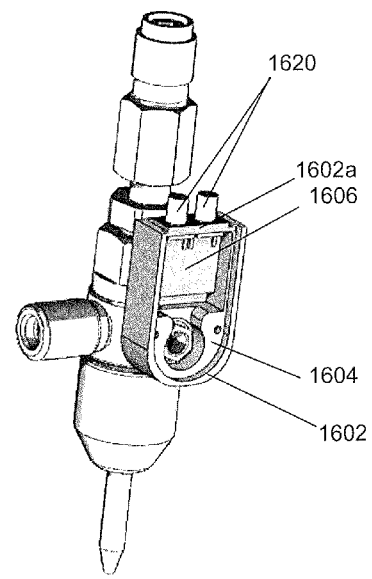
FIG. 16b
FIG. 16c
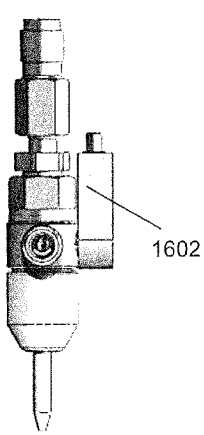
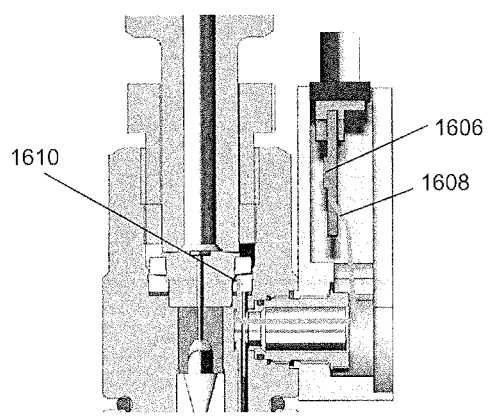

IDENTIFYING LIQUID JET CUTTING SYSTEM COMPONENTS

CROSS REFERENCE TO RELATED APPLICATIONS

This application is a continuation-in-part of U.S. Ser. No. 14/075,692, filed Nov. 8, 2013 and titled "Identifying Thermal Processing Torch Components," which is a continuation-in-part of U.S. Ser. No. 13/838,919, filed Mar. 15, 2013 and titled "Systems, Methods, and Devices for Transmitting Information to Thermal Processing Systems," which is a continuation-in-part of U.S. Ser. No. 13/560,059, filed Jul. 27, 2012 and titled "Optimization and Control of Material Processing Using a Thermal Processing Torch," which is a continuation-in-part of U.S. Ser. No. 13/439,259, filed Apr. 4, 2012 and titled "Optimization and Control of Material Processing Using a Thermal Processing Torch." The contents of all of these applications are hereby incorporated herein by reference in their entirety.

TECHNICAL FIELD

This disclosure relates generally to liquid jet cutting systems and more particularly to conveying information related to liquid jet cutting system components.

BACKGROUND

Material processing systems, such as plasma arc torches and liquid jet systems, are widely used in the cutting, gouging and/or marking of materials. For example, a liquid jet cutting system is configured to cut a workpiece by applying a jet of liquid, such as water, at high velocity to rapidly erode the workpiece. A liquid jet cutting system generally includes a cutting head comprising an orifice and a nozzle, a high-pressure pump, and a computer numerical controller (CNC). The high-pressure pump, such as an intensifier pump, can be coupled to the cutting head to pressurize water or another suitable liquid to a high pressure (e.g., from 10,000-100,000 PSI) and force the liquid through a small nozzle and orifice of the cutting head to create a liquid jet with high velocity (e.g., up to 2,200 MPH). In some applications, an abrasive is introduced into the liquid jet stream to cut harder materials. The precise delivery and composition of the liquid jet can be controlled by the CNC.

Typically, a liquid jet cutting system includes multiple consumables, including a nozzle and an orifice. Each consumable can be selected to achieve optimal performance (e.g., a maximized lifespan) in view of specific processing constraints, such as the type of material being cut. Installing incorrect consumables into a liquid jet cutting system can result in poor cut quality. In addition, incorrect consumables can reduce consumable life and lead to premature consumable failure. Currently, an operator needs to manually identify the orifice and nozzle for installation into the cutting head of a liquid jet cutting system to ensure that the proper combination is used. The operator also needs to track component life manually or use the CNC to perform such tracking, but with manual input. Even when correct consumables are installed in a liquid jet cutting system, it can be difficult for an operator to configure and optimize system operating parameters corresponding to the selected consumables. For example, the operator needs to check the nozzle to obtain the realized growth information and manually adjust the kerf compensation value accordingly prior to cutting.

SUMMARY

Thus, systems and methods are needed to automatically detect consumables installed in a liquid jet cutting system (e.g., detect incompatible consumables installed in a liquid jet cutting system). In addition, systems and methods can be used to automatically adjust operating parameters to enhance cutting quality and prolong consumable life. In general, systems and methods are used to efficiently convey information about various components of a liquid jet cutting system to facilitate operational control and optimization.

In some aspects, a consumable component of a liquid jet cutting system is provided. The consumable includes a body defining a conduit for a liquid jet and a signal device located on or within the body for transmitting a signal associated with the consumable component to a reader.

In some embodiments, the liquid jet cutting system is a water jet system configured to cut a workpiece. In some embodiments, the consumable component of the cutting system comprises one of a nozzle or an orifice. In some embodiments, the signal device comprises a radio-frequency identification (RFID) tag. In some embodiments, the signal transmitted by the signal device identifies at least one feature unique to a type of the consumable component. The type of the consumable component can comprise a type of a nozzle or orifice of the liquid jet cutting system.

In some embodiments, the body comprises at least one connection mechanism for coupling the body to the liquid jet cutting system. In some embodiments, the signal device is located on a low-pressure region of the body.

In some embodiments, the signal device is configured to record the number of pressure cycles the consumable component has been exposed to. In some embodiments, the signal transmitted by the signal device comprises instructions for automatically configuring at least one operating parameter of the liquid jet cutting system. The signal transmitted by the signal device can comprise at least one of a time or duration of use of the consumable component or a condition of use of the consumable component. The condition of use can comprise (i) an operating parameter or (ii) identification of a second component for installation into the liquid jet cutting system that is compatible with the consumable component.

In some aspects, a liquid jet cutting system is provided. The liquid jet cutting system includes at least one reader, a pump, a cutting head fluidly connected to the pump and a computing device. The cutting head includes a cutting head body, a plurality of replaceable components connected to the cutting head body and defining at least a portion of a conduit for receiving a liquid jet, and a plurality of signal devices assigned to respective ones of the plurality of replaceable components. The plurality of signal devices are configured to communicate to the reader information associated with the corresponding replaceable components. The computing device is communicatively coupled to the at least one reader for receiving the information from the reader.

In some embodiments, the computing device comprises at least one of a computer numerical controller (CNC) or a pump programmable logic controller (PLC). The computing device can be configured to automatically adjust at least one operating parameter of the liquid jet cutting system at least in part based on the information received from the at least one reader. The at least one operating parameter can be a kerf setting. In addition, the computing device can be configured to automatically determine the identities of each of the plurality of replaceable components at least in part based on the information received from the reader.

In some embodiments, the plurality of replaceable components comprise a nozzle and an orifice of the liquid jet cutting system. In such a configuration, the plurality of signal devices can comprise a first signal device disposed on the nozzle and a second signal device disposed on the orifice. The information transmitted by the reader can identify at least one of a type of the nozzle or a type of the orifice.

In some embodiments, the information transmitted by the reader comprises at least one of a time or duration of use of the corresponding replaceable components. In some embodiments, at least one of the plurality of signal devices comprises an RFID tag. In some embodiments, the cutting head further comprises a high pressure liquid inlet. The cutting head can further comprises an abrasive inlet.

In some embodiments, the liquid jet cutting system further comprises a plurality of readers disposed on the cutting head body for communicating with the plurality of signal devices about the information associated with the corresponding replaceable components. In addition, the system can include a plurality of wires connected to the plurality of readers. The plurality of wires are disposed within the cutting head body. Furthermore, a connector can be communicatively coupled to the plurality of readers via the wires. The connector can be configured to transmit the information from the plurality of readers to a CNC or a PLC of the liquid jet cutting system. The connector can be further configured to convert the information in the form of an analog signal to a digital signal.

In some embodiments, the liquid jet cutting system further comprises an intensifier associated with the pump for pumping a cutting liquid. The liquid jet cutting system can also include an accumulator fluidly connected to the pump.

In some aspects, a method is provided for operating a liquid jet cutting system. The method includes installing a replaceable component into a liquid jet cutting head of the liquid jet cutting system. The replaceable component includes an identification mechanism. The method further includes communicating information between the identification mechanism and a reader of the liquid jet cutting system and adjusting at least one operating parameter of the liquid jet cutting system based on the information.

The method can further comprise determining, based on the information communicated, at least one of (i) a period of use of the replaceable component, (ii) a predicted life expectancy of the replicable component, (iii) a predicted stroke rate for the pump, or (iv) a kerf setting for the liquid jet cutting system. In some embodiments, the method further comprises detecting a system leak by comparing the predicted stroke rate to an actual stroke rate. In some embodiments, the method further comprises detecting a poppet failure by analyzing the predicted stroke rate.

In some embodiments, the at least one operating parameter comprises a cutting parameter that is automatically adjusted based on the information communicated. In some embodiments, the replacement component is one of a nozzle or an orifice. In some embodiments, the information communicated identifies a type of the nozzle or orifice. The information can also comprise at least one of a time or duration of use of the replaceable component or a condition of use of the replaceable component.

In some aspects, a method for identifying a consumable of a thermal processing torch can include directing a gas flow through a flow-restriction element associated with the consumable disposed within the thermal processing torch; determining a first pressure of the gas flow at a location upstream relative to the flow-restriction element; determining a second pressure of the gas flow at a location downstream from the flow-restriction element; determining a flow rate of the gas flow passing through the flow-restriction element; and using the first pressure, the second pressure, and the flow rate to identify the consumable.

Embodiments can include one or more of the following features.

In some embodiments, determining the first pressure can include setting the gas flow to a known pressure and determining the flow rate can include measuring the flow rate. Determining the flow rate can include setting the gas flow rate to a known value; and determining the first pressure can include measuring the pressure of the gas flow. Determining a second pressure of the gas flow can include establishing the pressure as atmospheric pressure (e.g., 0 psig). The flow-restriction element can be an orifice associated with the consumable. In some cases, the method can also include using a flow coefficient equation to determine the dimension of the orifice based the first pressure, the second pressure and the flow rate. In some examples, the dimension of the orifice can be correlated to the consumable or a type of the consumable for identifying the consumable. In some cases, the flow-restriction element can be an exit orifice of a nozzle. The flow-restriction element can alternatively or additionally include a vent hole of a nozzle or a swirl ring. In some cases, different flow-restriction elements are selected for different types of consumables. In some cases, the flow-restriction element can include absence of a vent hole.

In some aspects, a method for identifying a consumable of a thermal processing torch (e.g., a torch that includes a plasma chamber defined by an electrode and a nozzle) can include directing an inlet flow of a gas through a gas supply line to the plasma chamber; manipulating at least one of: a) the inlet flow of the gas to the plasma chamber using a regulator coupled to the gas supply line until a criterion is reached or b) a vent valve coupled to a vent line connected to the plasma chamber to control an outlet flow of the gas from the plasma chamber; determining a first value of at least one operating parameter of the torch associated with one of the inlet flow or the outlet flow of the gas; and identifying the consumable based on the first value of the at least one operating parameter.

Embodiments can include one or more of the following features.

In some embodiments, manipulating the vent valve to control the outlet flow of the gas from the plasma chamber can include limiting the outlet flow of the gas from the plasma chamber prior to the criterion being reached. The method can also include manipulating the vent valve to permit the outlet flow of the gas from the plasma chamber through the vent line after the criterion is reached; determining a second value of the at least one operating parameter of the torch; and using the first value and the second value of the at least one operating parameter to identify the consumable. In some examples, the at least one operating parameter can include one of a supply pressure of the inlet flow, a flow rate of the inlet flow, an off-valve pressure of the inlet flow, or a flow rate of the outlet flow. In some cases, the supply pressure of the inlet flow or the flow rate of the inlet flow can be measured between a gas supply valve and the regulator coupled to the gas supply line, the regulator being positioned downstream from the gas supply valve. In some cases, the off-valve pressure of the inlet flow can be measured by a pressure transducer positioned downstream from the regulator on the gas supply line. The flow rate of the outlet flow can be measured at the vent line. The method can also include using a lookup table to identify the consumable based on the first value, wherein the lookup table correlates one or more consumables with respective values of one or more operating parameters. In some examples, the criterion can include a threshold pressure value of about 4.0 pound per square inch (psig) in the plasma chamber. The consumable can be a nozzle having at least one metering hole of a unique dimension for a given nozzle design.

In some aspects, a method for identifying a consumable of a thermal processing torch, the torch including a plasma chamber defined by an electrode and a nozzle can include directing an inlet flow of a gas through a gas supply valve and a gas supply line to the plasma chamber, where the gas supply line has a regulator and a plasma off-valve coupled thereto; adjusting the inlet flow of the gas until a threshold pressure associated with the plasma chamber is reached; manipulating a vent valve coupled to a vent line connected to the plasma chamber to limit an outlet flow of the gas from the plasma chamber before the threshold pressure value is reached; determining at least one of: (i) a first value of a pressure of the inlet flow, (ii) a first value of a flow rate of the inlet flow, (iii) a first value of an off-valve pressure of the inlet flow or (iv) a first value of a flow rate of the outlet flow; manipulating the vent valve to permit the outlet flow of the gas from the plasma chamber after the threshold value is reached; determining at least one of: (i) a second value of the pressure of the inlet flow, (ii) a second value of the flow rate of the inlet flow, (iii) a second value of the off-value pressure of the inlet flow, or (iv) a second value of the flow rate of the outlet flow; and using the first or second value of the pressure of the inlet flow, the first or second value of the flow rate of the inlet flow, the first or second value of the off-valve pressure of the inlet flow, or the first or second value of the flow rate of the outlet flow, or a combination of any two or more such values, to identify the consumable.

Embodiments can include one or more of the following features.

In some embodiments, the threshold pressure can be a pressure of about 4.0 pound per square inch (psig) in the plasma chamber or the vent. The consumable can be a nozzle having at least one metering hole of a unique dimension. The method can include also using a flow sensor coupled to the gas supply line to measure the flow rate of the inlet flow, the flow sensor being positioned between the gas supply valve and the regulator. The method can also include using a flow sensor coupled to the vent line to measure the flow rate of the outlet flow, the flow sensor being positioned downstream from the vent valve. In some examples, the first and second values of the pressure of the inlet flow can be measured upstream from the regulator. In some examples, the first and second values of the flow rate of the inlet flow are measured upstream from the regulator. In some examples, the first and second values of the off-valve pressure of the inlet flow are measured downstream from the regulator. In some examples, the first and second values of the flow rate of the outlet flow can be measured at the vent line. In some examples, manipulating the vent valve to permit the outlet flow of the gas from the plasma chamber can be performed prior to ignition of the torch.

In some aspects, a system for identifying a consumable of a thermal processing torch includes a flow-restriction element associated with the consumable and configured to receive a gas flow therethrough; a first sensor to determine a first pressure of the gas flow through the flow-restriction element at a location upstream relative to the flow-restriction element; a second pressure determining device to establish a second pressure of the gas flow through the flow-restriction element at a location downstream from the flow-restriction element; a flow meter for measuring a flow rate of the gas flow passing through the flow-restriction element; and a processor that uses the first pressure, the second pressure, and the flow rate to identify an operating characteristic of the consumable.

Embodiments can include one or more of the following features.

In some examples, the system can include at least one radio-frequency identification (RFID) tag on, in, or in communication with, the consumable for identifying the consumable. The second pressure determining device can be a device configured set the second pressure to atmospheric pressure. For example, the device can be configured set the second pressure to atmospheric pressure can include a vent valve. The second pressure determining device can include a second pressure sensor.

In some aspects, a torch of a cutting system configured to identify a consumable installed in the torch can include a vent passage fluidly connected to a fluid flow path of the torch; a flow detection device configured to detect a rate of fluid flow being expelled from the torch through the vent passage; and a vent valve fluidly connected to the vent passage configured to limit the fluid flow from being expelled from the fluid flow path of the torch through the vent passage.

Embodiments can include one or more of the following features.

In some embodiments, the torch can also include a pressure sensor fluidly connected to the vent passage, where the pressure sensor is configured to detect a fluid pressure within the vent passage. The fluid flow path can include a plasma plenum region of the torch. The vent passage can be fluidly connected to the fluid flow path by an identifying orifice of the consumable installed in the torch.

In one aspect, a method is provided for configuring a first thermal processing system and a second thermal processing system. The method includes providing a first consumable for use in a first thermal processing torch and a second consumable for use in a second thermal processing torch. The first consumable and the second consumable have substantially identical physical characteristics. The first consumable is associated with a first signal device encoded with first data and the second consumable is associated with a second signal device encoded with second data. The method includes mounting the first torch with the first consumable in the first thermal processing system and the second torch with the second consumable in the second thermal processing system. The method also includes sensing, by the first thermal processing system, the first data stored in the first signal device and sensing, by the second thermal processing system, the second data stored in the second signal device. The method further includes configuring, by the first thermal processing system, a parameter of the first thermal processing system for operating the first torch based on the sensed first data by assigning a first value to the parameter. In addition, the method includes configuring, by the second thermal processing system, the parameter of the second thermal processing system for operating the second torch based on the sensed second data by assigning a second value to the parameter. The second value can be different from the first value.

In another aspect, a method is provided for assembling a first thermal processing torch and a second thermal processing torch. The method includes providing a first consumable with a first signal device located on or within a body of the first consumable and providing a second consumable with a second signal device located on or within a body of the second consumable. The method includes encoding the first signal device with first data associated with the first consumable. The first data correlates to a first value of a parameter of a first thermal processing system for operating the first torch. The method further includes encoding the second signal device with second data associated with the second consumable. The second data correlates to a second value of the parameter of a second thermal processing system for operating the second torch. The second value can be different from the first value.

In other examples, any of the aspects above can include one or more of the following features. In some embodiments, at least one of the first or second data is independent of a detectable physical characteristic of the corresponding first or second consumable. At least one of the first or second data can identify a type of the corresponding first or second consumable. The type of the corresponding consumable can include a nozzle, a shield, an electrode, an inner retaining cap, an outer retaining cap, a swirl ring or a welding tip. In addition, at least one of the first or second data can identify a serial number unique to the corresponding first or second consumable. At least one of the first or second data can transmitted to the corresponding first or second thermal processing system as a pneumatic signal, a radio signal, a light signal, a magnetic signal or a hydraulic signal.

In some embodiments, at least one of the first signal device or the second signal device comprises a radio-frequency identification (RFID) tag. At least one of the first signal device or the second signal device can be located on or within a body of the corresponding first or second consumable. In some embodiments, the first or second signal device is located at a surface of the body of the corresponding first or second consumable to minimize heat exposure during torch operation. The surface can be adjacent to a cooling mechanism, remote from a plasma arc, or in an o-ring channel of the corresponding first or second consumable, or a combination thereof.

In some embodiments, the parameter includes a torch height above a workpiece, a flow rate of a plasma gas, a flow rate of a shield gas, a timing of plasma gas or current, or a process program for cutting the workpiece. In some embodiments, the parameter is included in a set of parameters configurable by at least one of the first or second thermal processing system to operate at least one of the first torch or second torch. In such a case, the first and second thermal processing systems can assign a value to each of the set of parameters for operating the respective first and second torches.

In some embodiments, the method further includes providing a first workpiece and a second workpiece for processing by the first torch and the second torch, respectively. The first and second workpieces are at least substantially the same.

In some embodiments, sensing the first data stored in the first signal device further includes using a signal detector of the first thermal processing system to sense the first data. The signal detector can be an RFID reader. The signal detector can be located external to the first torch.

In some embodiments, the first and second thermal processing systems are the same thermal processing system.

In another aspect, a method is provided for configuring a thermal processing system. The method includes providing a consumable for use in a thermal processing torch. The consumable has one or more physical characteristics that facilitate installation into the torch. The method includes mounting the consumable in the torch, connecting the torch to the thermal processing system and sensing, by the thermal processing system, data associated with the consumable. The method further includes configuring, by the thermal processing system, one or more parameters of the thermal processing system for operating the torch based on whether the sensed data satisfies a criterion.

In some embodiments, configuring one or more parameters of the thermal processing system includes preventing the thermal processing system from operating the torch if the data does not satisfy the criterion. The data can identify a manufacturer of the consumable that does not match a permitted manufacturer.

In some embodiments, the data is encoded in a signal device coupled to the consumable. Sensing can be performed by an RFID reader of the thermal processing system.

In some embodiments, the method further includes preventing configuration of one or more parameters of the thermal processing system in the absence of any data sensed by the thermal processing system.

In some aspects, some embodiments may have one or more of the following advantages. Using the systems and methods described herein that include identifying thermal processing torch components, such as plasma torch consumables (e.g., plasma torch nozzles, shields, retaining caps, or other consumables), by detecting changes in fluid flow (e.g., a drop in fluid pressure or flow) through features of the consumables, thermal processing torch systems can identify the consumables in a less expensive or a less complex manner than some other consumable identification techniques and processes.

In some aspects, the systems and methods described herein can be used to identify plasma torch consumables without requiring supplemental identifying devices (e.g., visual markings, bar codes, readable information tags (RFID tag readers), or other identification devices). Without requiring supplemental identification devices, additional systems, such as systems that would read and interpret the identification devices, such as camera vision systems, barcode reading systems, or RFID reading systems can, in some cases, be omitted from plasma torch systems, resulting in a less expensive, less complicated plasma torch system. Additionally, using the identification systems and methods described herein, consumables typically need not be modified to include the identifying devices, resulting in less expensive torch consumables. Further, since the methods described herein essentially utilize only geometry of one or more features of a consumable to identify the consumable, previously manufactured consumables can be mounted onto a plasma torch system and identified, which may not be possible with identification techniques that utilize supplemental identification devices. That is, in some cases, the systems and methods described herein actually identify physical features of the consumables as opposed to merely reading or detecting an identifying device in or on the consumable.

It should also be understood that various aspects and embodiments of the invention can be combined in various ways. Based on the teachings of this specification, a person of ordinary skill in the art can readily determine how to combine these various embodiments. For example, in some embodiments, any of the aspects above can include one or more of the above features. One embodiment of the invention can provide all of the above features and advantages.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1 is a cross-sectional view of an exemplary plasma arc torch.

FIG. 2 is a schematic diagram of an exemplary communication network.

FIG. 12 is an example lookup table which can be used to identify a consumable component based gas flow characteristics of a thermal processing torch system in which the consumable component is installed.

FIG. 15 is an exemplary design of a cutting head for housing an RFID communication system.

FIGS. 16a-c are another exemplary design of a cutting head for housing an RFID communication system.

DETAILED DESCRIPTION

Figure 3:
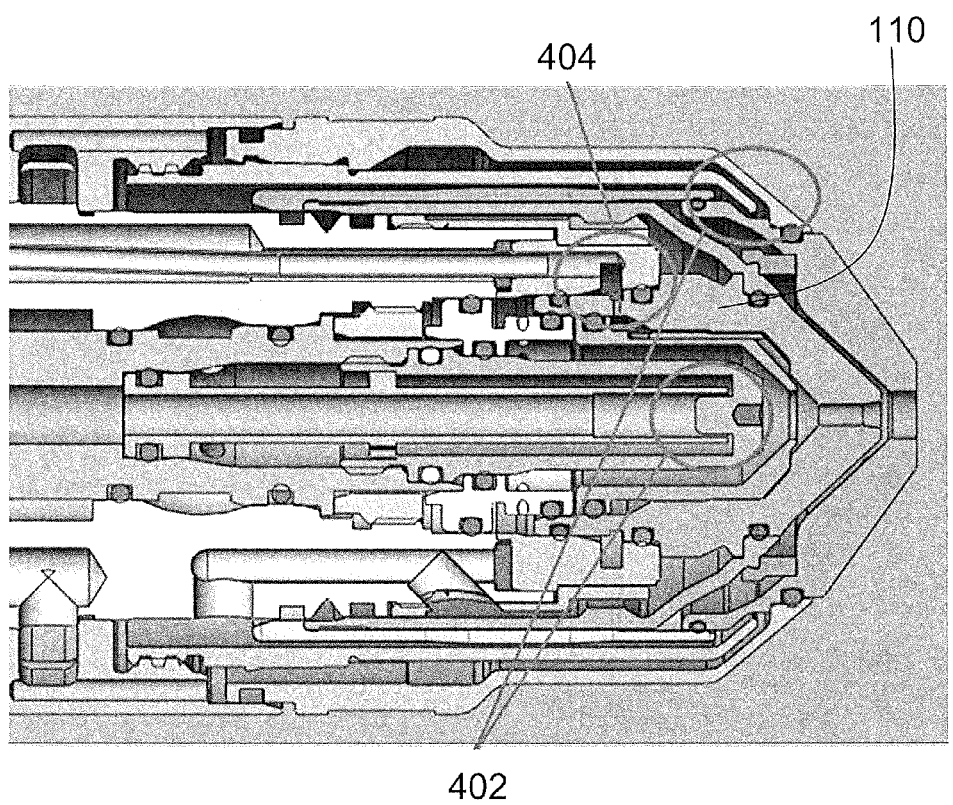
FIG. 3 is a cross-sectional view of an exemplary plasma arc torch illustrating an altered geometry of various consumable components of the plasma arc torch.

In some aspects, material processing systems (e.g., liquid jet cutting systems and plasma torch systems) can automatically identify system components (e.g., consumable components) and information related to the components by processing signals transmitted by one or more signal devices assigned to the components.

In some aspects, thermal processing torch systems (e.g., plasma torch systems) can identify torch components (e.g., consumable components) by directing a fluid flow (e.g., a coolant fluid flow or a plasma gas flow) through a feature of the consumable and detecting changes in the flow properties (e.g., fluid pressure and fluid flow rate) of the fluid flow exiting feature of the consumable.

FIG. 1 is a cross-sectional view of an exemplary plasma arc torch 100 including a torch body 102 and a torch tip 104. The torch tip 104 includes multiple consumables, for example, an electrode 105, a nozzle 110, a retaining cap 115, a swirl ring 120, and a shield 125. The torch body 102, which has a generally cylindrical shape, supports the electrode 105 and the nozzle 110. The nozzle 110 is spaced from the electrode 105 and has a central exit orifice mounted within the torch body 102. The swirl ring 120 is mounted to the torch body 102 and has a set of radially offset or canted gas distribution holes 127 that impart a tangential velocity component to the plasma gas flow, causing the plasma gas flow to swirl. The shield 125, which also includes an exit orifice, is connected (e.g., threaded) to the retaining cap 115. The retaining cap 115 as shown is an inner retaining cap securely connected (e.g., threaded) to the nozzle 110. In some embodiments, an outer retaining cap (not shown) is secured relative to the shield 125. The torch 100 can additionally include electrical connections, passages for cooling, passages for arc control fluids (e.g., plasma gas), and a power supply. In some embodiments, the consumables include a welding tip, which is a nozzle for passing an ignited welding gas.

In operation, plasma gas flows through a gas inlet tube (not shown) and the gas distribution holes 127 in the swirl ring 120. From there, the plasma gas flows into a plasma chamber 128 and out of the torch 100 through the exit orifice of the nozzle 110 and the shield 125. A pilot arc is first generated between the electrode 105 and the nozzle 110. The pilot arc ionizes the gas passing through the nozzle exit orifice and the shield exit orifice. The arc then transfers from the nozzle 110 to a workpiece (not shown) for thermally processing (e.g., cutting or welding) the workpiece. It is noted that the illustrated details of the torch 100, including the arrangement of the components, the direction of gas and cooling fluid flows, and the electrical connections, can take a variety of forms.

Different operating processes often require different shield and/or plasma gas flow rates, which require different sets of consumables. This leads to a variety of consumables being used in the field. Using the correct consumables and matching them appropriately is necessary to achieve optimal cutting performance. Consumable mismatch (e.g., using a consumable made for operation at 65 Amps in a torch that is being operated at 105 Amps) can result in poor consumable life and/or poor performance of the plasma arc torch.

FIG. 2 shows an exemplary communication network 200 of the present invention. The communication network 200 includes one or more signal devices 202, each assigned to a consumable of a thermal processing torch, such as the plasma arc torch 100 of FIG. 1. Exemplary consumables include the electrode 105, the nozzle 110, the retaining cap 115, the swirl ring 120, and the shield 125. In some embodiments, a signal device 202 is an electrically writable device configured to transmit information about a consumable in the form of one or more signals. For example, the signal device 202 can be a radio-frequency identification (RFID) tag or card, bar code label or tag, integrated circuit (IC) plate, or the like. In some embodiments, a signal device 202 is a detector (e.g., a sensor) for detecting a physical characteristic of the consumable and transmitting the detected information in the form of one or more signals. The communication network 200 also includes at least one receiver 204 for (i) receiving signals transmitted by the signal devices 202, (ii) extracting data conveyed by the signals, and (iii) providing the extracted data to a processor 206 for analysis and further action. The processor 206 can be a digital signal processor (DSP), microprocessor, microcontroller, computer, computer numeric controller (CNC) machine tool, programmable logic controller (PLC), application-specific integrated circuit (ASIC), or the like.

In some embodiments, each signal device 202 is encoded with information pertaining to the consumable to which the signal device 202 is assigned. The encoded information can be generic or fixed information such as the consumable's name, trademark, manufacturer, serial number, and/or type. The encoded information, for example, can include a model number to generally indicate that the consumable is a nozzle. In some embodiments, the encoded information is unique to the consumable, such as metal composition of the consumable, weight of the consumable, date, time and/or location at which the consumable was manufactured, personnel responsible for the consumable, and the like. As an example, the encoded information can provide a serial number, which is unique to each torch component manufactured, to distinguish, for example, nozzle Type A, Serial #1 from nozzle Type A, Serial #2.

In some embodiments, information is encoded to a signal device 202 at the time of manufacture of the corresponding consumable. Information can also be encoded to a signal device 202 during the lifetime of the consumable, such as after each consumable use. Such information can include the date, time and location of consumable use, any abnormalities detected during use, and/or consumable conditions after use so that a log can be created to predict a failure event or end-of-life event associated with the consumable.

Information encoded to a signal device 202 can also specify operating parameters. For example, for a signal device 202 associated with the shield 125, data encoded to the signal device 202 can indicate the type of shield gas and/or the appropriate gas flow rate for the shield 125. In some embodiments, encoded data of a signal device 202 provides information about other related torch components. For example, encoded data can identify other torch components that are compatible with the assigned consumable, assisting with installation of the entire consumable set in a torch to achieve certain performance metrics.

In some embodiments, a signal device 202 includes information about the corresponding consumable independent of a detectable physical characteristic of the consumable. Examples of detectable physical characteristics of the consumable include magnetic properties, surface reflectivity, density, acoustic properties and other tactile features of the consumable measured by a detector installed in the torch. Therefore, examples of consumable data independent of a detectable physical characteristic of the consumable can include consumable name, type, manufacturer, manufacturing date, manufacturing location, serial number, or other non-tactile features of a consumable. In some embodiments, the signal device 202 stores pre-collected information of the consumable, including physical characteristics, before it is installed into the torch, but the signal device 202 is not configured to actively measure or detect the physical characteristics. However, the signal device 202 can store physical characteristics about the consumable measured or detected by another device, such as by a sensor. Generally, the signal device 202 is used mainly for data storage purposes.

In some embodiments, the signal device 202 is located inside or on the torch 100. For example, the signal device 202 can be attached to a surface of a consumable that is ultimately installed inside of the torch tip 104. The signal device 202 can also be attached to a component inside of the torch 100 other than the assigned consumable. For example, while a signal device 202 is assigned to store data about the electrode 105, the signal device 202 can be affixed to a surface of the retaining cap 115. In some embodiments, the signal device 202 is coupled to an external source that is not physically associated with the torch 100. For example, the signal device 202 can be attached to a package used to store the consumable and is remote from the consumable once it is installed in the torch 100. If a signal device 202 is located inside of the torch 100, the surface to which the signal device 202 is attached can be selected to reduce or otherwise minimize heat exposure during operation of the torch 100. For example, the signal device 202 can be located near a cooling mechanism, away from the plasma arc, and/or in an o-ring channel of the torch 100 to reduce or minimize heat exposure. In addition, the signal device 202 can be coated with a heat protective material to reduce the likelihood that the device will overheat during torch operation. Generally, the signal device 202 can be situated, such as being shielded by another torch component, to minimize exposure to thermal energy, radiation, damaging gases (e.g., ozone), and/or high-frequency energy.

In some embodiments, a signal device 202 is designed to be durable, i.e., functional during and after one or more torch ignitions. In some embodiments, a signal device 202 is disposable after each torch use or after several uses. In some embodiments, a signal device 202 is writable once, for example, to encode information about a consumable when the consumable is first manufactured. In some embodiments, a signal device 202 is writable multiple times, such as throughout the lifespan of the corresponding consumable.

In the communication network 200, the signal device 202 can wirelessly transmit its stored information to the receiver 204 in the form of one or more signals. The receiver 204 is adapted to process these signals to extract pertinent data about the consumable and forward the data to the processor 206 for analysis. In some embodiments, the receiver 204 is located in or on the plasma arc torch 100. For example, the receiver 204 can be located in the torch body 102. In some embodiments, the receiver 204 is at a location external to the torch 100, such as attached to a power supply module, a gas console, the processor 206, etc.

In some embodiments, at least one of the signal devices 202 is an RFID tag and the receiver 204 is a reader used to interrogate the RFID tag. In such embodiments, the RFID tag includes a microchip for storing information and an antenna for receiving and transmitting RF signals. The reader can include (1) an antenna for transmitting RF signals to the RFID tag to interrogate the tag and (2) components for decoding a response transmitted by the RFID tag before forwarding the response to the processor 206. The RFID tag can be either active or passive. An active RFID tag includes a battery to produce a stronger electromagnetic return signal to the reader, thereby increasing the possible transmission distance between the RFID tag and the reader. The distance between an RFID tag and a reader can be from less than one inch to 100 feet or more, depending on the power output, the radio frequency used and the type of material through which the RF signals need to travel. In one example, the distance between an RFID tag and an antenna of a corresponding reader can be about 2-4 cm. A reader antenna and remaining reader components do not need be in the same packaging. For example, the reader antenna can be located on or inside of the torch body 102 while the remaining reader components are external to the torch 100. Using an RFID tag is advantageous because it does not require direct contact (e.g., via wires) or direct line of sight (e.g., via optical signals) with the reader and is well suited for use in harsh environments.

In some embodiments, a signal device 202 is a detector (e.g., a sensor) for detecting at least one physical marker of the consumable for uniquely identifying the consumable by its type or individually. The physical marker can be a physical alteration of the consumable, for example. As shown in FIG. 3, identification of a consumable is achieved by altering the geometry of the consumable such that, when it is installed in the torch 100, it affects the wall of an adjacent coolant passageway 402, which in turn alters the rate of a coolant flowing therethrough. Specifically, the altered section of the coolant passageway 402 can restrict the rate of the coolant flow. A signal device 202 can be used to measure the pressure change as a function of the coolant flow rate. Hence, the measured coolant pressure change serves as an identification of the consumable. In another example as shown in FIG. 3, an auxiliary vent line 404 that is connected to a valve and a flow meter is attached to the nozzle 110 to identify the nozzle 110. The valve is opened prior to plasma arc ignition and the auxiliary vent line flow rate is measured by a signal device 202 as a function of plasma pressure during a purge cycle. Therefore, the measured flow rate serves as an identification of the nozzle 110. In another example, one or more uniquely sized metering holes (not shown) can be drilled into the outer retain cap to identify the cap once it is installed in the torch 100. The size of each metering hole is configured to uniquely affect the off-valve pressure and/or the flow rate of the shield gas. Therefore, these measurements, taken by a signal device 202 in a pre-flow routine prior to pilot arc ignition, serve to identify the outer retaining cap.

In yet another example, the shield 125 can be identified by measuring the consumable's length relative to a reference torch datum. In an exemplary measurement process, a torch height controller is used to determine the height at which a known torch fires and begins to cut a workpiece. This height can serve as the reference torch datum. Then, after installing an unidentified consumable into the torch, the height relative to the reference datum is determined. Therefore, simple calculations involving the two heights can be used to determine the relative length of the unidentified consumable. In turn, the relative consumable length can be used to identify the consumable by, for example, referencing a looking-up table that correlates relative consumable lengths to consumable parts.

In some embodiments, a signal device 202 is a barcode that provides optical machine-representation of data about the corresponding consumable. A barcode can be read by the receiver 204 in the form of a barcode reader. Generally, a signal device 202 can convey data about a consumable in the form of any machine readable signals, including radio signals, optical or other light-based signals (e.g., infrared signals or ultraviolet signals), magnetic signals, pneumatic signals, or hydraulic signals.

In some embodiments, a single signal device 202 is assigned to each consumable of a torch to transmit pertinent information about the corresponding consumable. In some embodiments, two or more signal devices 202 are assigned to the same consumable to transmit different information about that consumable. For example, one signal device 202 can transmit information unique to the consumable type, such as the model number and operating parameters for the consumable type, while another signal device 202 can transmit information unique to the consumable itself, such as weight and usage history of the consumable. In some embodiments, the signal devices 202 in the communication network 200 employ different modes of data transmission. For example, while one signal device 202 transmits data as RF signals, another signal device 202 transmits data as optical signals. In some embodiments, the network 200 includes multiple receivers 204. Each receiver 204 is configured (e.g., tuned) to read signals from one or more of the signal devices 202 and transmit the extracted data to the processor 206. In some embodiments, a single receiver 204 is used to read signals from all signal devices 202 in the communication network 200. The processor 206 thus can simultaneously process data associated with multiple consumables.

Figure 4:
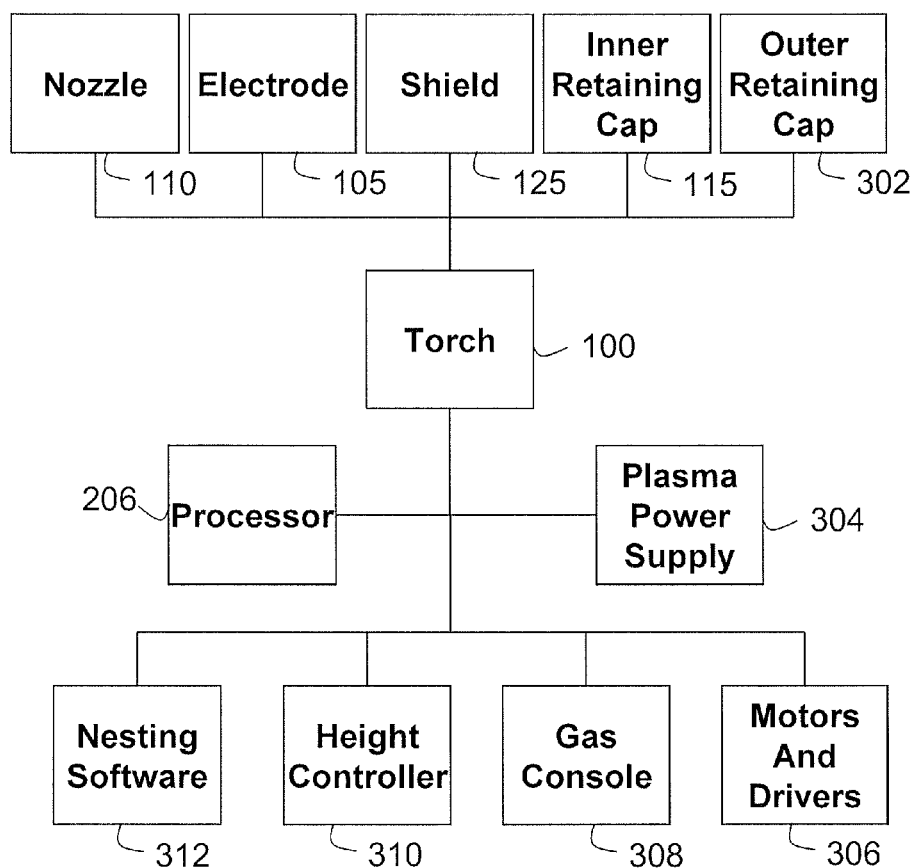
FIG. 4 is a schematic diagram of an exemplary thermal processing system using the communication network of FIG. 2 to control the operation of a thermal processing torch.

FIG. 4 is an exemplary thermal processing system 300 using the communication network of FIG. 2 to control the operation of a thermal processing torch, such as the plasma arc torch 100 of FIG. 1. The plasma arc torch 100 can include one or more consumables including the nozzle 110, the electrode 105, the shield 125, the inner retaining cap 115 and an outer retaining cap 302. At least one signal device 202 is assigned to at least one of the consumables for transmitting information about the corresponding consumable to the processor 206 via the receiver 204. The system 300 also includes a power supply 304 for providing the electrical current necessary to generate plasma arc in the torch 100. Data collected from the signal devices 202 about the respective consumables can be used by the processor 206 to control and optimize the operation of at least one of the plasma power supply 304, the motors and drivers 306, the gas console 308, the height controller 310 and the nesting software 312.

The processor 206 can be located inside or outside of the plasma arc torch 100. In some embodiments, the processor 206 is housed in the power supply 304. In some embodiments, each of the plasma power supply 304, the motors and drivers 306, the gas console 308, the height controller 310 and the nesting software 312 houses at least one processor for processing data from the signal devices 202 to control the functions of the respective module 304, 306, 308 or 310.

Based on the information collected from the signal devices 202, the processor 206 can regulate many plasma system functions simultaneously or near simultaneously and in real-time or near real-time. These system functions include, but not limited to, start sequence, CNC interface functions, gas and operating parameters, and shut off sequences. In some embodiments, the processor 206 uses consumable information to automatically set various parameters of the system 300. In some embodiments, the processor 206 uses consumable information to verify whether certain preset parameters of the system 300 are compatible with the consumables inside of the torch 100. As an example, based on the data collected about the multiple consumables of the torch 100, the processor 206 can control and verify one or more of the following system components: (i) settings of the power supply 304 for regulating power to the torch 100, (ii) settings of the nesting software 312 for processing a workpiece, (iii) settings of the gas console 308 for controlling shield and/or plasma gases supplied to the torch 100, (iv) settings of the height controller 310 for adjusting the height between the torch 100 and the workpiece, and (v) settings of various motors and drivers 306.

In some embodiments, based on the data collected from one or more signal devices 202, the processor 206 interacts with the nesting software 312 to automatically select a cutting program that sets parameters for processing a workpiece, such as the cutting speed, direction, paths, nesting sequences, etc. The cutting program can also define the gas types, gas pressure and/or flow settings and height control settings for the torch in view of the collected consumable data. Traditionally, when a set of consumables is assembled into a torch, an operator needs to manually configure the nesting software 312 to create the cutting program for the torch by supplying information to the software including the type and thickness of the workpiece material being processed, the type of gas being used, and the current rating of the consumable set. In particular, the operator needs to manually input into the processor 206 the current rating of the consumable set. In the present invention, because the current rating information for each consumable is stored in at least one signal device 202, the processor 206 can electronically collect such information from the one or more signal devices 202 and automatically determine the appropriate current setting without user input.

In some embodiments, based on the collected consumable data, the processor 206 selects a suitable cutting program from the nesting software 312 by taking into consideration of consumable data from the signal devices 202 and user-input operating parameters, including the characteristics of the workpiece being cut and the desired cut shape. For example, an operator can first send a generic program file to the nesting software 312. The generic program file specifies, for each workpiece thickness, variable cut speeds, gas flows, kerf compensations, torch heights, etc. that change with different consumable parts. Thus, after identifying the consumables using the signal devices 202, the processor 206 interacts with the generic program file to configure a cutting program for the torch. In some embodiments, after a cutting program is created, the processor 206 uses consumable data collected from the signal devices 202 to verify whether correct consumables are installed into the torch that are appropriate for the program. Alternatively, the processor 206 can instruct the nesting software 312 to automatically set or correct parameters of the program to enhance compatibility with the consumables loaded into the torch. For example, a consumable requiring 400 A current has larger kerfs and lead-ins in comparison to a consumable requiring 130 A current. Accordingly, the nesting software 312 can select fewer parts to fit on a nest of the program if the 400 A consumable is loaded into a torch.

In some embodiments, based on the data collected from one or more signal devices 202, the processor 206 can manipulate a gas console 308 to control flow of plasma and shield gases to the torch 100 by verifying and adjusting the gas console settings. The gas console 308 houses solenoid valves, flow meters, pressure gauges, and switches used for plasma and shield gas flow control. For example, the flow meters are used to set the pre-flow rates and cut flow rates for the plasma and shield gases. The gas console 308 can also have a multi-inlet gas supply area where the plasma and shield gases are connected. A toggle switch can be used to select the desired gases. The plasma and shield gases are monitored by gas pressure sensors. In one example, a signal device 202 associated with the shield 125 of the plasma arc torch 100 can store information about the type and composition of one or more shield gases suitable for use with the shield 125, along with the optimal flow rate setting of the shield gases. Based on this data, the processor 206 can interact with the gas console 308 to provide the plasma arc torch 100 with the appropriate shield gas at the optimal flow rate.

In some embodiments, based on the data collected from one or more signal devices 202, the processor 206 manipulates the torch height controller 310, which sets the height of the torch 100 relative to the workpiece. The torch height controller 310 can include a control module to control an arc voltage during cutting by adjusting the standoff (i.e., the distance between the torch 100 and the work piece) to maintain a predetermined arc voltage value. The torch height controller 310 can also include an external control module to control the standoff. The torch height controller 310 can further include a lifter, which is controlled by the control module through a motor or driver 306, to slide the torch 100 in a vertical direction relative to the workpiece to maintain the desired voltage during cutting. In one example, based on the data collected from the consumables of a torch, the torch height controller 310 can automatically determine the height to position the torch relative to the top of a workpiece. Therefore, the torch height controller 310 does not need to perform a height sense in order to set an appropriate pierce height and cut height before beginning arc voltage control. In some embodiments, based on the data collected from one or more signal devices 202, the processor 206 manipulates the motors and drivers 306 to move the torch 100 laterally in relation to the surface of the workpiece. The processor 206 can also manipulate the height controller 310 to move the torch 100 vertically in relation to the surface of the workpiece.

In some embodiments, the processor 206 is configured to prevent the thermal processing system 300 from commencing an operation on the workpiece if it determines that the consumables installed in the torch 100 are mismatched with each other, not compatible with the thermal processing system 300 or inconsistent with other pre-selected operating parameters input by an operator. If such a determination is made, the processor 206 can trigger an audio or visual alert indicating to the operator that one or more of the connected consumables are unsupported and that the consumables should be replaced or operator inputs should be revised. Additionally, the processor 206 can prevent initiation of an operation if an alert is triggered. For example, the processor 206 can stop torch operation if the current setting of the shield 125, which is conveyed to the processor 206 by a signal device 202 assigned to the shield 125, is different from the current setting of the nozzle 110, which is conveyed to the processor 206 by a different or the same signal device 202 corresponding to the nozzle 110.

In some embodiments, the processor 206 is configured to prevent the thermal processing system 300 from operating if it determines that at least one of the consumables installed in the torch 100 is not manufactured or otherwise supported by an accepted manufacturer. For example, the processor 206 can stop torch operation if it does not recognize the manufacturer identification, serial number and/or parts number conveyed by a signal device of a consumable. Hence, the thermal processing system 300 can be used to detect and prevent the use of inferior or counterfeit consumables.

In some embodiments, the processor 206 recommends one or more remedial actions to the operator to address alarm situations. For example, the processor 206 can suggest one or more consumables to install in the torch 100 to avoid potential mismatch with other components of thermal processing system 300. The processor 206 can suggest suitable types of workpiece for processing based on the ratings of the installed consumable set. The processor 206 can recommend a cutting sequence that reconciles the settings of the installed consumables with settings provided by the operator.

Generally, the signal devices 202 can store information about torch components other than consumables. For example, the signal devices 204 can store information about the torch body 102 or about one or more leads. Therefore, as one in the art will fully appreciate, the exemplary communication network 200 of FIG. 2 and the configuration of FIG. 3 can be easily adapted to store information about any torch component.

Figure 5:
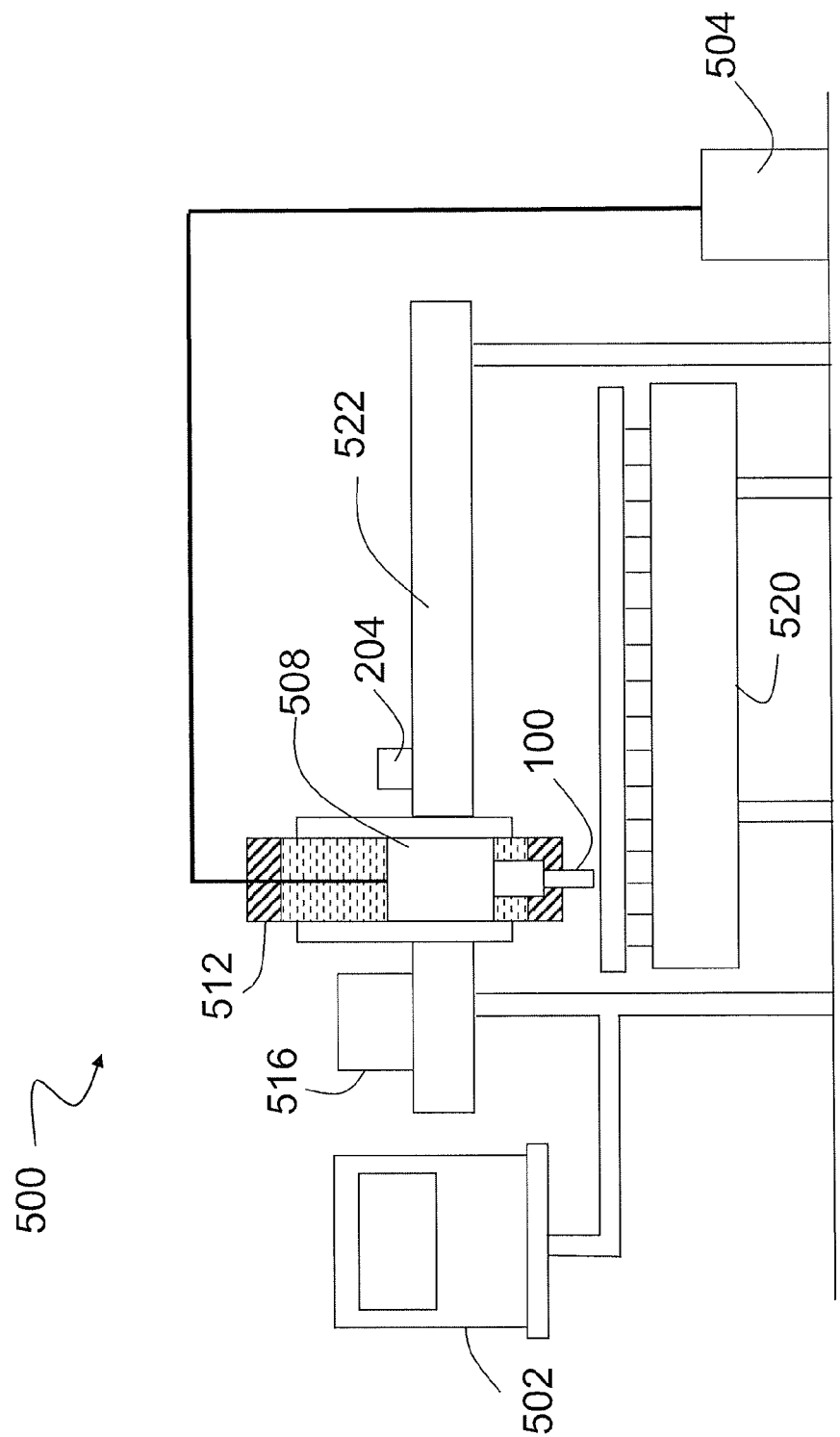
FIG. 5 is a diagram of another exemplary thermal processing system using the communication network of FIG. 2 to control the operation of a thermal processing torch.

FIG. 5 is another exemplary thermal processing system 500 using the communication network 200 of FIG. 2 to influence, control, or otherwise affect the operation of a thermal processing torch, such as the plasma arc torch 100 of FIG. 1. The thermal processing system 500 includes a computerized numeric controller (CNC) 502, a power supply 504, an automatic process controller 508, a torch height controller 512 and a driver system 516, which are similar to the processor 206, the power supply 304, the gas console 308, the height controller 310 and the motor and drivers 306, respectively, of the operating system 400. In addition, the thermal processing system 500 includes a cutting table 520.

To operate the thermal processing system 500, an operator places a workpiece on the cutting table 520 and mounts the torch 100 into the torch height controller 512, which is attached to the gantry 522. The driver system 516 and the height controller 512 provide relative motion between the tip of the torch 100 and the workpiece while the torch 100 directs plasma arc along a processing path on the workpiece. In some embodiments, at least one receiver 204 is attached to a component of the thermal processing system 500 to receive signals emitted by at least one signal device 202 associated with one or more consumables of the torch 100. For example, a receiver 204 can be coupled to the gantry 522 to read signals from the torch 100 after the torch 100 is installed into the system 500. The receiver 204 can also be attached to other system components including, for example, the CNC 502, the height controller 512, the driver system 516 or the cutting table 520. In some embodiments, the receiver 204 is mounted inside or on the surface of the torch 100. In some embodiments, multiple receivers 204 are disbursed throughout the system 500 external to the torch 100, each receiver 204 being tuned to read data concerning one or more specific consumables of the torch 100. For example, while one receiver 204 is used to receive data from a signal device 202 assigned to a nozzle, another receiver 204 is used to read data from a signal device 202 assigned to a shield. After obtaining information from a signal device 202, the receiver 204 can transmit the information to the CNC 502, which uses the information to configure the thermal processing system 500 for processing.

In some embodiments, signal devices 202 associated with two sets of physically identical (or at least substantially identical) consumables are encoded with different consumable information and installed into two different torches. For example, a signal device for the nozzle of one torch can be encoded with Serial Number A while another signal device for the nozzle of a second torch can be encoded with Serial Number B, even though the two nozzles are manufactured to identical design specifications. The nozzles are installed into the respective torches. The two torches are installed into their respective thermal processing systems, and the receiver 204 of each thermal processing system can receive consumable data from the signal device 202 of each torch. In some embodiments, based on the different consumable data, the thermal processing systems are adapted to suitably adjust one or more operating parameters of the systems so as to operate the torches differently, even when the consumables of the two torches are physically identical to each other and all extraneous factors are the same (e.g., the material type and thickness of the workpieces being processed by the two torches are the same). For example, based on the different consumable data, the consumable data can cause the thermal processing systems to interact with the respective nesting software 312 to enable different cutting programs for the two torches and/or interact with the respective height controllers 512 to set different heights for the two torches. In general, based on the different consumable data, one thermal processing system corresponding to one torch can be configured to include features A, B, or C while a second thermal processing system corresponding to the other torch can be configured to include features X, Y or Z. In some embodiments, the same thermal processing system can be configured in different manners depending on the consumable data encoded in the two torches. Exemplary features customizable by a thermal processing system include: plasma gas flow and timing, shield gas flow and timing, cutting current and timing, pilot arc initiation and timing, torch height above the surface of a workpiece and/or torch lateral motion parallel to the surface of a workpiece.

In some embodiments, a thermal processing system is adapted to activate a proprietary process for operating a torch only after determining that the information about one or more consumables in the torch satisfies certain criteria, such as being manufactured by a specific manufacturer. This information is stored on one or more signal devices 202 coupled to the consumables, and may be accessed by the thermal processing system. Therefore, if the consumables are produced by a different manufacturer and do not have the correct (or any) information encoded in their signal devices 202, the thermal processing system does not initiate the proprietary process, even if the "incorrect" consumables are physically identical to the consumables produced by the desired manufacturer. In some embodiments, a thermal processing system does not initiate a proprietary process when the system does not sense any data from the torch consumable. This can occur if, for example, the consumable is not associated with a signal device 202 or the signal device is defective. Therefore, a configuration process executed by a thermal processing system can simply involve the system detecting whether a consumable is associated with the correct data and/or alert the operator if incorrect or no information is detected from the consumable. An exemplary alert include an alarm, a visual indicator, or a combination thereof. In addition, the system can prevent operation of a torch in response to detecting incorrect or no information from the consumable.

Figure 6A:
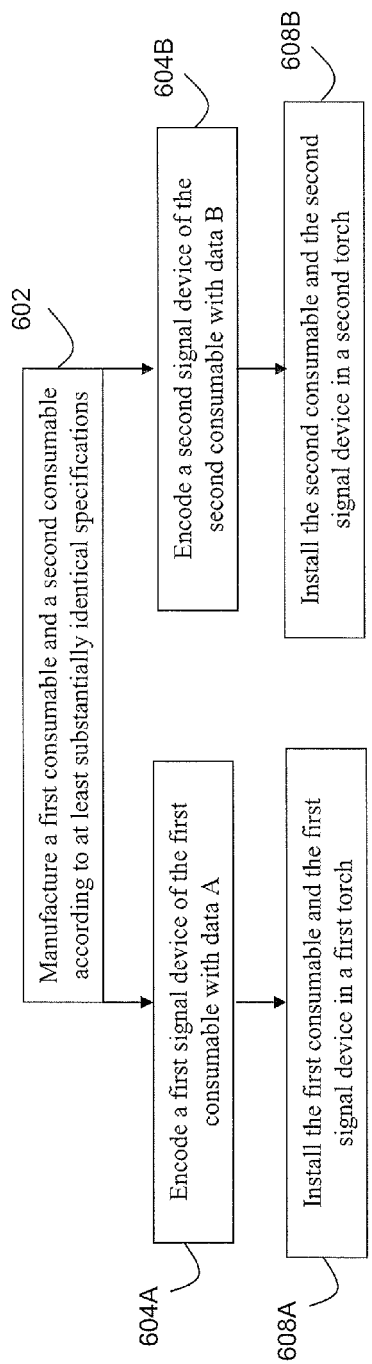
FIGS. 6A and 6B are flow charts illustrating exemplary operations of the communication network of FIG. 2.
Figure 6B:
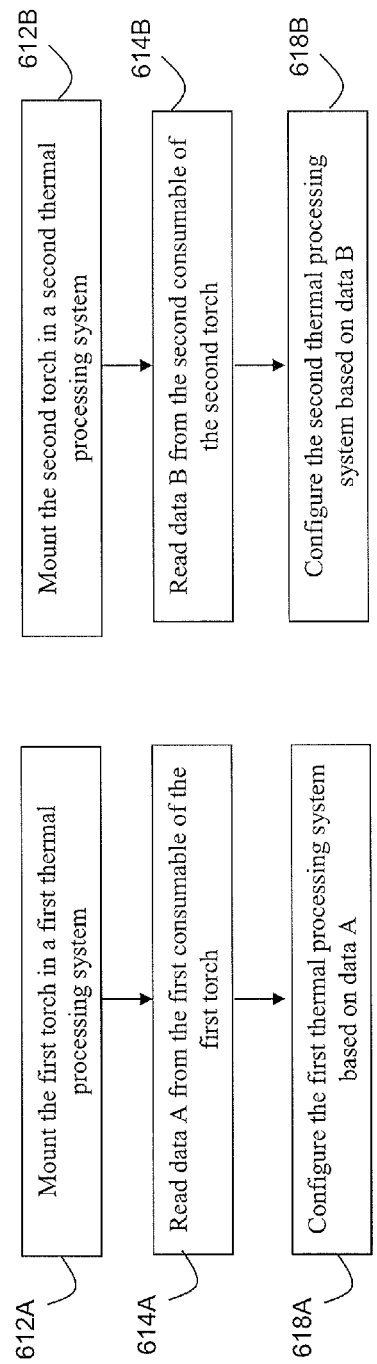

FIGS. 6A and 6B are flow diagrams illustrating exemplary operations of the communication network 200 of FIG. 2. FIG. 6A illustrates an exemplary process for assembling thermal processing torches to include one or more consumables and signal devices 202. Specifically, at step 602, two consumables are provided, with both consumables manufactured based on the same, or substantially the same, physical specifications. As a result, the two consumables have identical, or substantially identical, physical characteristics. A signal device 202, such as an RFID tag, can be coupled to each of the two consumables. Each signal device 202 can be located on or within the body of the corresponding consumable. At steps 604A and 604B, the signal device 202 for each consumable is encoded with data that can be used to determine system configuration settings for operating the corresponding torch. For example, one consumable can be encoded with data A while the other consumable can be encoded with data B, where data A and data B can be used to set one or more operating parameters of the respective thermal processing systems for operating the respective torches. In some embodiments, data A and data B include different serial numbers assigned to the respective consumables, which correlate to different values for setting the operating parameters of the thermal processing systems. Exemplary operating parameters associated with a thermal processing system include a height of the torch above a workpiece, a flow rate of a plasma gas through the torch and a cutting program for processing a workpiece using the torch. At steps 608A and 608B, each consumable manufactured at step 602, along with its respective signal devices 202, is assembled into a torch.

FIG. 6B illustrates an exemplary process for configuring two thermal processing systems, such as the thermal processing system 400 of FIG. 4 or the thermal processing system 500 of FIG. 5, in preparation for operating the two torches of FIG. 6A. At steps 612A and 612B, the torches are mounted into their respective thermal processing systems. With reference to the thermal process system 500, each torch can be mounted on the gantry 522 above the cutting table 520. At steps 614A and 614B, receivers 204 of the respective thermal processing systems are used to read the consumable data encoded in the signal devices 202 of the corresponding consumables. For example, at step 614A, a receiver 204 can read data A from the signal device 202 associated with the consumable of the first torch. At step 614B, another receiver 204 can read data B from the signal device 202 of the consumable of the second torch. At steps 618A and 618B, the receivers 204 of the thermal processing systems forward the data to the respective CNC's of the thermal processing systems, which set and/or adjust certain parameters of the corresponding thermal processing systems based on the received data to operate the corresponding torches. In some embodiments, the difference in the encoded data for the two consumables translates to different values for setting the operating parameters of the thermal processing systems, even though the consumables are physically identical to each other. In some embodiments, the thermal processing systems assign the same values to the operating parameters despite the dissimilarity in the encoded data.

In some embodiments, the method described with reference to FIG. 6B is implemented by a single thermal processing system, which is adapted to set operating parameters of the system for operating both torches either simultaneously or sequentially (i.e., one torch at a time).

In addition, as one in the art will fully appreciate, the invention described herein is not only applicable to plasma cutting devices, but also welding-type systems and other thermal processing systems. In some embodiments, the invention described herein is configured to operate with a variety of cutting technologies, including, but not limited to, plasma arc, laser, oxy fuel, and/or water-jet technologies. For example, the signal devices 202 can be coupled to one or more consumables configured to operate with one or more of the cutting technologies. The processor 206, using information transmitted by the signal devices 202, can determine whether the consumables installed in a torch are compatible with the specific cutting technology. In some embodiments, based on the selected cutting technology and the consumable information, the processor 206 can set or adjust operating parameters accordingly, such as the height of the cutting head above the workpiece, which can vary depending on the cutting technology and the consumables.

As an example, it is known to use water-jet systems that produce high pressure, high-velocity water jets for cutting various materials. These systems typically function by pressurizing water or another suitable fluid to a high pressure (e.g., up to 90,000 pounds per square inch or more) and force the fluid through a small nozzle orifice at high velocity to concentrate a large amount of energy on a small area. An abrasive jet is a type of water jet, which can include abrasive materials within the fluid jet for cutting harder materials. In some embodiments, the signal devices 202 are attached to consumables of a water-jet system, such as to a water-jet orifice, a mixing tube used to mix abrasive particles with fluid, and/or one or more high pressure cylinders, pump seals or valves. A signal device 202 associated with a water jet orifice can, for example, identify the size of the orifice, track the hours of operation, and can also indicate other consumables that are suitable for use with a particular orifice. Identification of particular consumable set combinations for a given water-jet system can also be performed, to verify compatibility with a given system or to set operating conditions and parameters, such as water pressure, or abrasive types or amounts.

In some aspects, thermal cutting systems, such as plasma arc cutting torches can include devices and features that enable detection or identification of consumable components installed within the torch by directing a gas flow through the torch (e.g., through a feature of the consumable component) and detecting the manner in which the gas flow is altered as it flows through the torch and the consumable component. For example, in some embodiments, a gas flow is directed through features (e.g., flow-restriction elements including metering holes, vent holes, gas exit orifices, flow distribution passages, or other features) arranged on a consumable (e.g., a nozzle or a swirl ring). Based on observed changes in one or more fluid flow characteristics (e.g., gas pressure or flow rate) upstream and downstream of the features, the size of the features, and therefore the consumable itself, can be identified. As discussed below, the following described methods can also be implemented using water-jet systems to identify various components installed in the system.

Figure 7:
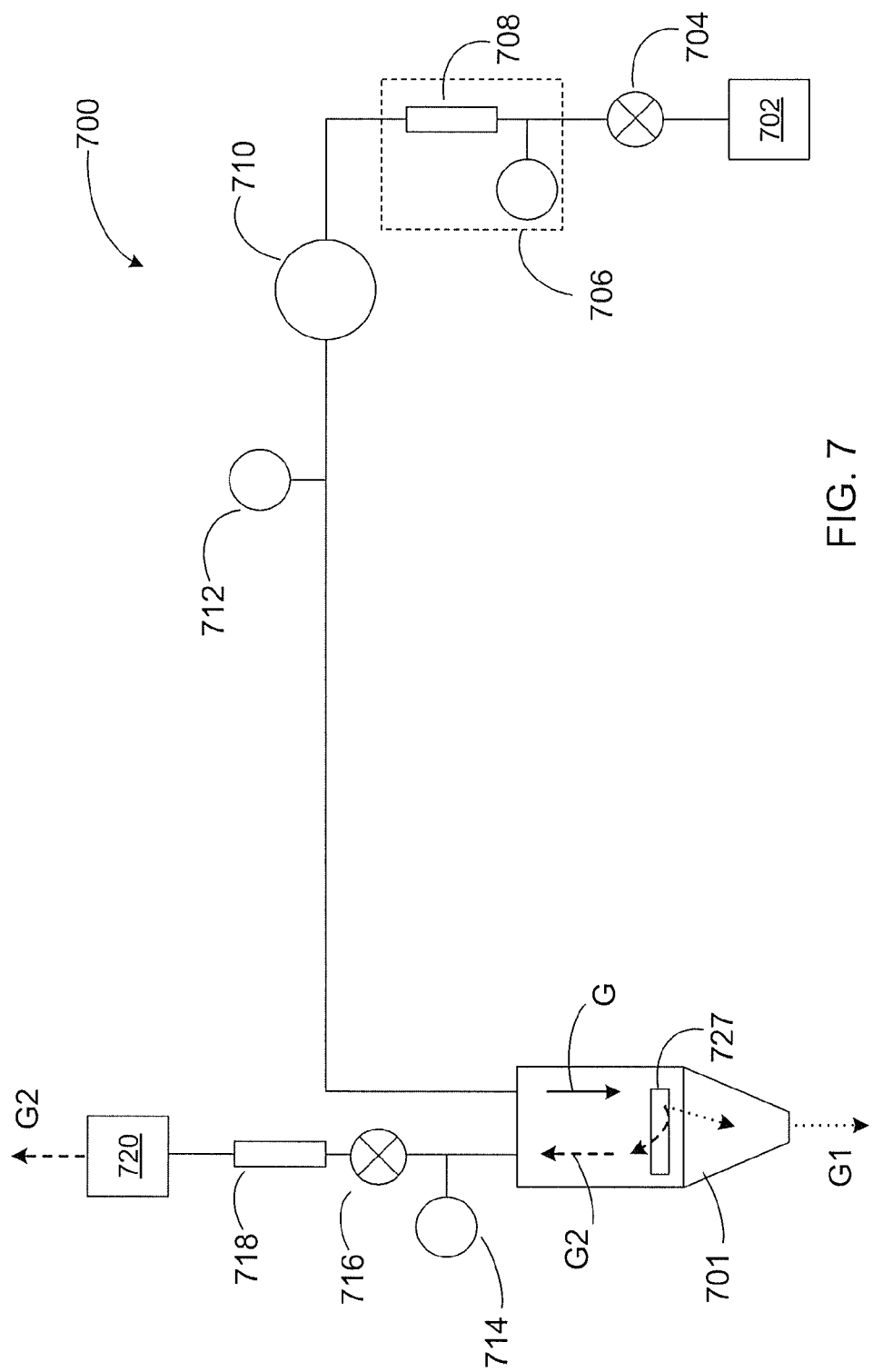
FIG. 7 is a schematic diagram of an exemplary torch gas delivery system including flow detection devices for identifying consumable components installed within a torch of the exemplary torch system.

To monitor gas flow through a material processing system (e.g., a plasma arc torch system or a water-jet system), the system can include various gas flow detection devices, such as valves, pressure detectors, pressure regulators, gas flow meters, and other devices, which can all be fluidly connected to one another by gas tubing, such as semi-rigid tubing or flexible hose. Referring to FIG. 7, in some embodiments, a fluid (e.g., gas) delivery system 700 for delivering gas to a material processing device (e.g., a torch (e.g., a torch head)) 701 can include a fluid supply (e.g., a compressed air tank or air compressor) 702, a supply off-valve 704, a supply pressure sensor 706, a supply gas flow detector 708 (as illustrated with a dashed line box, the supply pressure sensor 706 and the supply gas flow detector 708 can be a single component (e.g., a pressure compensated flow meter)), a supply gas pressure regulator 710, an off-valve pressure sensor 712, typically a vent pressure sensor (e.g., torch plasma plenum pressure sensor) 714, a vent off-valve 716, a torch vent gas flow detector 718, and a torch vent gas outlet 720. The gas supply 702 is typically fluidly connected to a torch system control unit (e.g., a power supply), which can house the supply off-valve 704, the supply pressure sensor 706, and the supply gas flow detector 708 (or the combined pressure compensated flow meter).

The supply gas pressure regulator 710 and the off-valve pressure sensor 712 are typically located separately from the control unit, for example, disposed on or within a torch gas supply lead line connected to the control unit for providing gas and electricity to a torch. In some cases, the supply gas pressure regulator 710 and the off-valve pressure sensor 712 are arranged near (e.g., within 10 feet of (e.g., within 6 feet of)) the torch 701 connected to the lead line at an end opposite the control unit. As discussed below, by arranging these components closer to the torch 701, gas pressure that is controlled and monitored within the lead line by the supply gas pressure regulator 710 and the off-valve pressure sensor 712 can more closely represent the actual pressure delivered to the torch.

As illustrated, these various components can be connected to one another by any of various structurally and chemically suitable tubes or hoses. Examples of suitable hoses include flexible hoses (e.g., flexible plastic or rubber hoses), rigid tubing (e.g., rigid metal, plastic or composite tubing), or tubing made of a combination of flexible and rigid layers, such as a flexible hosing having a braided outer component (e.g., a braided sheath). Some or all of these components can be in communication (e.g., wireless or wired communication) with a control unit (e.g., a processor within a torch system control unit) for monitoring and controlling the gas delivery system.

Based on the configurations of these various components, gas flows can exit the torch from one or more different areas. For example, when a gas flow G enters the torch head 701, a gas stream G1 is typically expelled out from the torch head (e.g., via the nozzle orifice). The gas stream G1 generally includes gas that would typically be used to generate a plasma stream and process a material. Additionally, when the gas flow G enters a flow restriction element, such as a distribution hole in a swirl ring 727 (shown in schematic form in FIG. 7), the gas flow G can be divided into multiple flow channels to form the gas stream G1 and a second gas stream G2. Therefore, for torch systems having a vent system, a second gas stream G2 can be directed by the swirl ring 727 (or a vent hole of a nozzle as mentioned below) and be emitted from the torch via the vent system based on whether or not certain components of the vent system (e.g., the vent off-valve 716) are opened or closed. In particular, in some embodiments, a gas stream G2 is emitted from the torch head when the vent off-valve 716 is open. That is, the gas stream G2 can be caused by gas flowing within the various flow channels and orifices within the torch head. As illustrated schematically, gas flow G can enter the torch via the off-valve hose and be divided into the gas stream G1 and the gas stream G2 within the torch head while the gas flows through the consumable components arranged within the torch (e.g., the swirl ring or the nozzle). For simplicity, the division of the gas within the torch into the gas stream G1 and gas stream G2 is schematically illustrated without showing the specific consumable components. Alternatively or additionally, in some cases, gas flow G is delivered to a nozzle from a swirl ring and a first portion (e.g., gas stream G1) can be directed to be expelled from the torch in the form of plasma gas and a second portion (e.g., gas stream G2) can be directed through the nozzle through a vent region (as discussed below with respect to FIG. 8), on to the flow restriction element, and out of the torch through a vent passage.

In some embodiments, a system (e.g., the system 700) for identifying a consumable component, such as a nozzle or a swirl ring, of a thermal processing torch includes a flow-restriction element (e.g., a nozzle orifice, a metering hole of a nozzle, a vent hole of a nozzle, or a gas distribution hole of a swirl ring) that is associated with the consumable and is configured to receive a gas flow therethrough, a first sensor (e.g., the off-valve pressure sensor 712) to determine the pressure of the gas flow through the flow-restriction element at a location upstream relative to the flow-restriction element, a second pressure determining device to establish a pressure of the gas flow through the flow-restriction element at a location downstream from the flow-restriction element, a flow meter (e.g., the vent gas flow detector 718) for measuring a flow rate of the gas flow passing through the flow-restriction element, and a control unit (e.g., processor) that uses the first pressure, the second pressure, and the flow rate to identify an operating characteristic of the consumable.

In some cases, the second pressure determining device can include a pressure sensor (e.g., the vent pressure sensor 714) fluidly connected to the torch vent, which can measure the pressure within the plasma plenum, for example, when the vent valve is closed. Alternatively or additionally, in some cases, the second pressure determining device includes a vent valve (e.g., the vent off-valve 716) that is configured to expose the location downstream from the flow-restriction element (e.g., the torch vent passage) to the atmosphere to set the pressure to atmospheric pressure. That is, in some cases, the second pressure is not explicitly measured by one of the components of the gas delivery system, but is rather set to atmospheric pressure (e.g., 0 psig). As discussed below, such a configuration can permit identification of a consumable using only one pressure sensor when the region downstream of the flow restriction element can be exposed to atmospheric pressure, for example, by opening the vent valve 716.

Additionally, as described above, in some embodiments, the system can include at least one radio-frequency identification (RFID) tag affixed on, in or in communication with the consumable for identifying the consumable.

Figure 8:
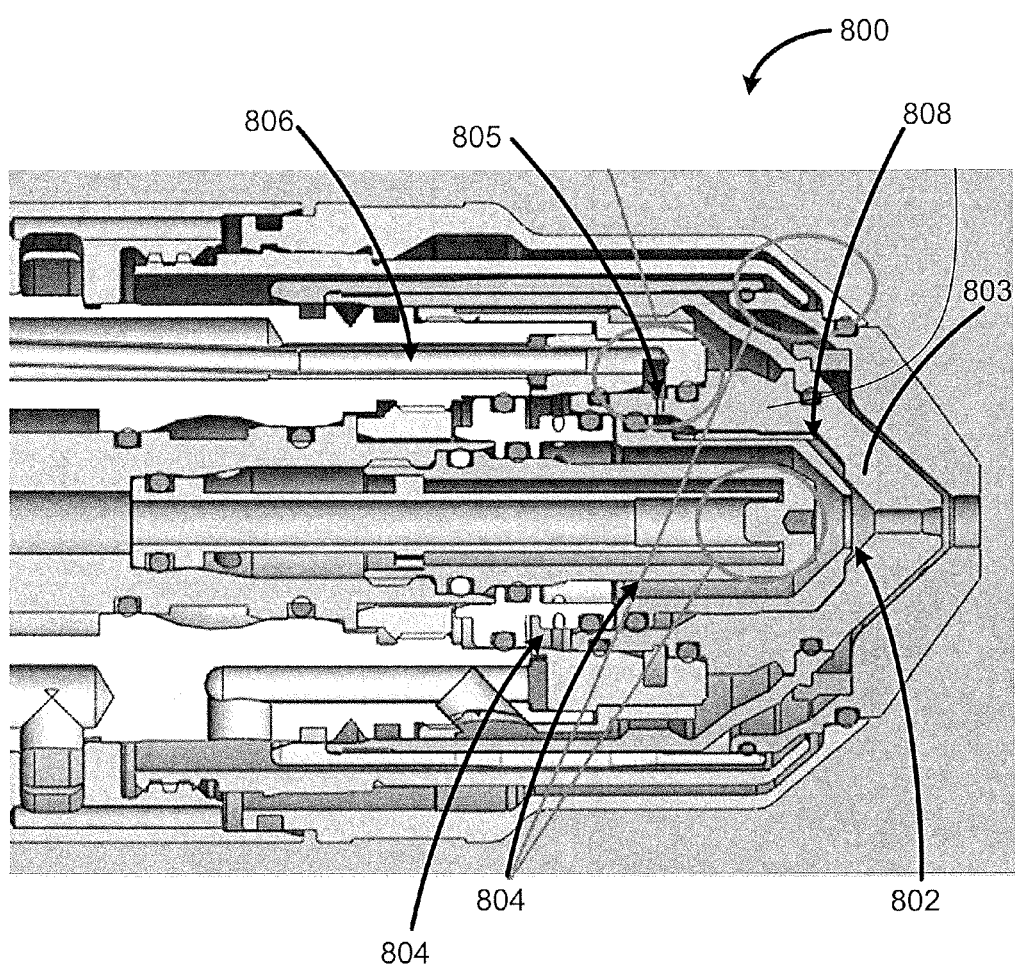
FIG. 8 is a cross-sectional view of an exemplary plasma arc torch illustrating geometric features within the plasma arc torch that can be utilized for identifying consumable components installed within a torch.

To measure and control gas pressure within various gas passageways of a torch head, the gas passageways can be fluidly connected to gas flow measurement devices (e.g., gas pressure or flow sensors). Alternatively, in some cases, gas flow measurement devices can be arranged within the torch head. Referring to FIG. 8, in some embodiments, a torch 800 includes a consumable (e.g., nozzle) 803 having a flow-restriction element (e.g., a nozzle vent identification hole) 805. A plasma plenum chamber 802 defined within the nozzle can be fluidly connected to a pressure sensor (e.g., the torch vent pressure sensor 714) so that gas pressure within the plasma chamber 802 can be monitored and measured. For example, when an off-valve pressure sensor 712 fluidly connected to a nozzle vent passage 806 (which is typically fluidly connected to a vent pressure sensor 714, a vent off-valve 716, and a torch vent gas flow detector 718) is closed, a pressure lock can be generated within the nozzle vent 806 and the plasma plenum chamber 802. Therefore, the common pressure detected by the vent pressure sensor can indicate the pressure within the plasma plenum chamber. A gas supply region 804 is typically located at a position upstream from the consumable 803. During use, gas (e.g., plasma cutting gas) can be delivered from the gas delivery system 700 to the gas supply region 804 through flow directing passages of the swirl ring. In the example illustrated, gas flows into the plasma chamber of the nozzle 803 and at least a portion of the gas entering the plasma chamber can flow out of the nozzle 803 through a nozzle vent region 808 and the vent hole (identification hole) 805. In such embodiments, the vent passage 806 can be considered a region that is downstream of the flow restriction element 805.

As discussed herein, the gas flow properties observed at various locations within gas delivery systems can be used to identify the consumable installed in the torch. For example, torch gas delivery systems (e.g., the torch gas delivery system 700) can be used to implement one or more various torch consumable component identification methods by manipulating and monitoring gas flow within the torch system.

For example, in some aspects, a gas flow (e.g., the gas flow G) can be provided to the torch and a vent off-valve can be closed to establish a predetermined gas pressure within the plasma plenum and vent passage of the torch by adjusting a pressure of the gas flow provided to the torch. With the vent off-valve closed, gas pressure begins to build within the torch plasma plenum region and the vent passage line so that gas substantially only exits through the torch exit orifice (i.e., in the form of the gas stream G1). Once the predetermined gas pressure is established within the plasma plenum region and the vent passage line, the pressure and gas flow rate of the gas flow directed through the consumable (e.g., the flow rate upstream of the consumable, such as the flow rate provided to the swirl ring) can be monitored and measured. The measured gas flow rates and pressures can be compared to known (or expected) corresponding gas flows and pressures for various different consumables. Based on the comparison to known values as discussed below in detail in the following examples, the type of consumable installed in the torch can be identified.

In some embodiments, once the predetermined gas pressure within the plasma plenum and vent passage is established, the vent off-valve can be opened to expose the flow region downstream of the flow restriction (e.g., the vent passage line) to atmospheric pressure so that gas can exit the torch through the torch head (gas stream G1), as well as through the vent (to form gas stream G2). With the gas stream G1 and the gas stream G2 flowing from the torch, the pressure and flow rate of gas directed to the consumable, as well as the gas flow through the vent can be measured. Similarly, the measured pressure and gas flow values can be compared to typical expected values associated with certain consumables to predict what type of consumable is installed in the torch. The above-described generic consumable identification methods can be implemented in any of various configurations.

Figure 9:
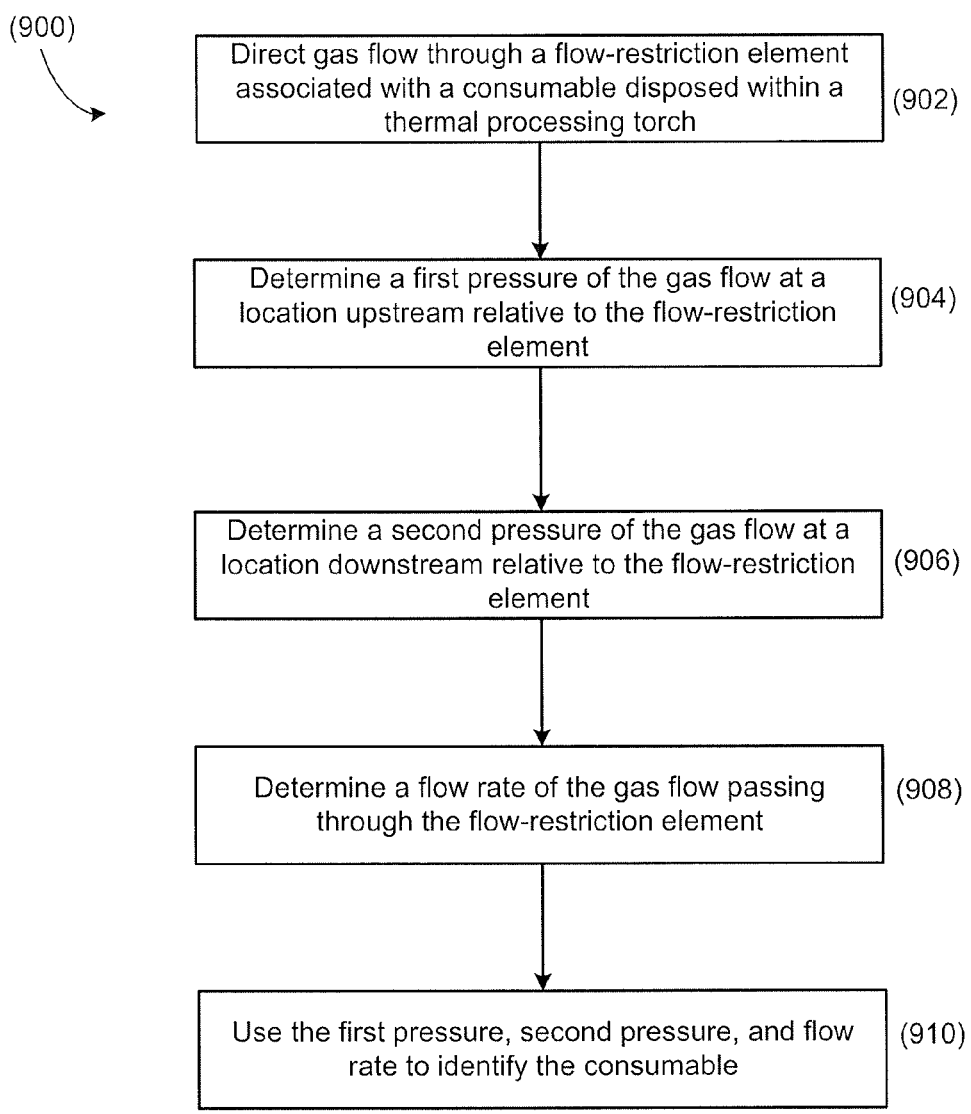
FIG. 9 is a flow chart illustrating an exemplary method for identifying a consumable component of a thermal processing torch by measuring gas flow changes through a feature of the consumable component.

Referring to FIG. 9, in some aspects, an exemplary method (900) for identifying a consumable of a thermal processing torch includes first directing a gas flow through a flow-restriction element associated with the consumable (e.g., a nozzle or a swirl ring) disposed within the thermal processing torch (902). For example, in some embodiments, gas is delivered to a torch head from a gas supply (e.g., the gas supply 702) via a gas delivery system (e.g., the regulator 710). The gas can be delivered to the torch head and directed through the flow-restriction element, such as an orifice associated with the consumable (e.g., an exit orifice of a nozzle (e.g., a plasma exit orifice), a gas distribution hole of a swirl ring, or another vent or metering hole of the consumable). In some embodiments, different flow-restriction elements can be used to identify different types of consumables. For example, when using a nozzle, the flow-restriction element can include an identifying vent hole or the plasma exit orifice of the nozzle and when using a shield, the flow-restriction element can include the vent holes of the shield. In some cases, a gas distribution hole can be used to identify a swirl ring.

In some embodiments, the flow-restriction element comprises an absence of a hole, for example, an absence of a vent hole on a nozzle. For example, a nozzle may not include an identifying vent hole such that when a vent valve is open, which would be expected to cause gas flow to begin flowing from the vent hole of the nozzle and out of the vent, no gas flow is detected by the vent flow detector. The lack of a detected vent flow when the vent valve is open would therefore indicate that a consumable without a vent hole is installed in the torch.

Next, a first pressure can be determined (904). For example, a pressure of the gas flow at a location upstream relative to the flow-restriction element can be determined. In some embodiments, the vent off-valve 716 can be closed to allow a pressure to build within the vent region and the plasma plenum, which can also cause the torch to substantially only produce the gas stream G1. With the vent off-valve 716 closed, the first pressure can be manually adjusted, for example using the pressure regulator 710, to set the pressure within the vent passage and the plasma plenum to a predetermined value. In some cases, the predetermined pressure value can be about 4 psig or another predetermined pressure based on the equipment's capabilities. Therefore, the pressure (e.g., the first pressure) of the gas being delivered to the torch head can be measured once the predetermined plasma plenum pressure is established. In some cases, the off-valve pressure sensor 712 is used to determine the pressure of gas directed to the flow-restriction element once the predetermined plasma plenum pressure is established. Alternatively, in some embodiments, the vent off-valve 716 can be opened to vent the region downstream of the flow restriction, such as downstream of a vent hole of a nozzle to atmospheric pressure, and the first pressure can be determined (e.g., measured) upstream using a sensor (e.g., an off-valve pressure sensor 712).

A second pressure is also determined (906). In particular, the pressure of the gas that has passed through the flow-restriction element and exits the torch head can be measured. For example, as discussed above, in some cases, the vent off-valve can be closed so that a pressure (e.g., the second pressure) is generated within the vent region and the plasma plenum. In particular, the second pressure can be determined by manually setting the second, downstream pressure (i.e., within the non-vented plasma plenum) to a predetermined pressure (e.g., 4 psig), for example, by adjusting the pressure regulator 710. Alternatively, in some embodiments, the second pressure is determined by setting the downstream pressure (e.g., the pressure within the vent region) to another known pressure (e.g., atmospheric pressure), for example, by opening the vent off-valve 716 to open the vent passage to the atmosphere.

With the first and second pressures determined, a flow rate of the gas flow passing through the flow-restriction element can be determined (908). For example, in some embodiments, a flow rate of gas provided to the torch can be measured, for example, using the flow detector 708. Alternatively or additionally, a flow rate of gas exiting the torch head through the vent (i.e., the gas stream G2) can be measured, for example, using the vent flow detector 718.

Then, using the detected first pressure, second pressure, and flow rate, the consumable can be identified (910). For example, once the gas pressures upstream and downstream of the flow-restriction element are determined and the flow rate of gas exiting the torch through the vent off-valve (i.e., the gas stream G2) is determined, the consumable can be identified (estimated) by accessing a look-up table. In some cases, a look-up table can include a listing of multiple torch consumables that are defined by their respective expected flow characteristics that would be produced using the identification methods described herein. In some cases, the look-up table can be electronically stored in a memory device of the torch control unit and accessed by the processor to identify the consumable (e.g., automatically identify). Briefly referring to FIG. 12, in some embodiments, a lookup table 1300 can include expected values for plasma gas flow rates (e.g., as measured by the flow detector 708), plasma gas pressure (e.g., as measured by the off-valve pressure sensor 712), vent gas flow rates (e.g., as measured by the vent flow detector 718), and plasma plenum pressure (e.g., as measured by the plenum pressure sensor 714). Example values are provided for a variety of different consumables (e.g., nozzles), which can be described according to a cutting process in which they are used (e.g., 400 amp (A) mild steel (MS), 260 A MS, 200 A MS, 130 A MS, 80 A MS, 50 A MS, and 30 A MS in the example chart listed). Using the lookup table 1300 and the example pressure and flow detection methods described herein, the type of consumable installed in the torch can be determined (estimated).

In some embodiments, the methods described herein can also include using a flow coefficient equation, which is used to describe the relationship between the pressure drop across an orifice and the corresponding flow rate through the orifice, to determine a dimension (e.g., a characteristic dimension, such as average width (e.g., average diameter)) of the orifice based the first pressure, the second pressure and the flow rate. For example, by knowing the pressure of fluid entering the orifice (e.g., the first pressure), the pressure of the fluid exiting the orifice (e.g., the second pressure), and the flow rate of fluid passing through the orifice, the flow coefficient can be calculated using commonly used flow coefficient equations. For example, alternatively or in addition to using the determined first pressure, second pressure, and flow rate to reference a look-up table to identify a consumable, in some embodiments, a control unit (e.g., a processor) can use the flow coefficient equations to determine what type of consumable is installed in the torch, for example, based on calculating and comparing the estimated flow-restriction element (e.g., orifice) dimension to known or expected flow-restriction element (e.g., orifice) sizes for different consumable types.

Figure 10:
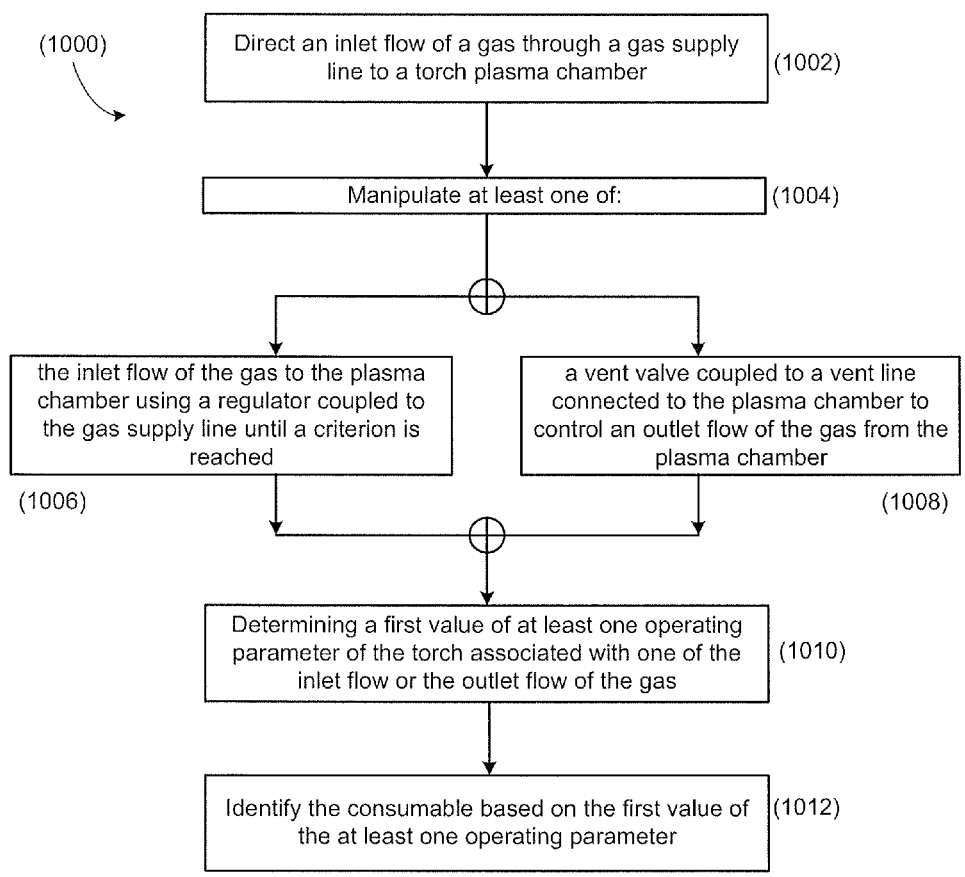
FIG. 10 is a flow chart illustrating another exemplary method for identifying a consumable component of a thermal processing torch by measuring gas flow changes through a feature of the consumable component.

Referring to FIG. 10, other methods, such as example method (1000) can also be implemented to identify a consumable of a thermal processing torch having a plasma chamber defined by an electrode and a nozzle. As described below, various methods can include adjusting gas flow through the consumable and monitoring the effect of the adjustments on flow characteristics observed upstream and/or downstream of the consumable.

For example, first, an inlet flow of a gas can be directed through a gas supply line to the plasma chamber (1002). For example, gas can be delivered to a gas delivery system (e.g., the system 700) from a gas supply (e.g., the gas supply 702) through a gas supply line (e.g., a lead line) to a plasma torch.

With gas being delivered, at least one of several gas flow characteristics can be manipulated (e.g., adjusted) (1004). For example, in some embodiments, the inlet flow of the gas to the plasma chamber can be manipulated using a pressure regulator (e.g., the regulator 710) coupled to the gas supply line until a criterion, such as a threshold pressure including a threshold plasma pressure is reached (1006). That is, if a vent valve (e.g., the vent valve 716) is already closed (based on use of the torch), the regulator can be adjusted until the criterion (e.g., threshold plasma pressure value) is established. The threshold plasma pressure value can be chosen based on the capabilities of the gas delivery system. For example, in some cases, the threshold pressure value is about 4.0 pound per square inch (psig).

Alternatively or additionally, a vent valve (e.g., the vent off-valve 716) coupled to a vent line connected to the plasma chamber can be manipulated to control an outlet flow of the gas from the plasma chamber (1008). That is, in some embodiments, a previously open vent valve can be manipulated (e.g., closed) to control the outlet flow of the gas from the plasma chamber to limit or prevent the outlet flow of the gas from the plasma chamber via the vent system prior to the criterion being reached. For example, the vent valve can be closed to limit the outlet flow of the gas from the plasma chamber (e.g., substantially eliminating the gas stream G2) so that the plasma plenum pressure can build to the threshold plasma plenum pressure value. Alternatively or additionally, in some embodiments, the vent valve can be opened to vent the vent region downstream of the flow restriction to establish the downstream pressure to be atmospheric pressure.

Next, a first value of an operating parameter of the torch associated with one of the inlet flow or the outlet flow of the gas can be determined (1010). The operating parameter can include any of various gas flow properties, such as a pressure or flow rate into or out of the consumable. For example, in some embodiments, the at least one operating parameter can include a supply pressure of the inlet flow (e.g., as measured by the supply pressure sensor 706), a flow rate of the inlet flow (e.g., as measured by the supply flow detector 708), an off-valve pressure of the inlet flow (e.g., as measured by the off-valve pressure sensor 712), or a flow rate of an outlet flow (e.g., the flow rate measured at the vent line (e.g., by the torch vent gas flow detector 718) or the plasma gas flow rate). In some cases, the supply pressure of the inlet flow or the flow rate of the inlet flow can be measured (e.g., measured using the supply pressure sensor 706) between a gas supply valve and the regulator (for example, when the regulator is positioned downstream from the gas supply valve) coupled to the gas supply line. In some embodiments, the off-valve pressure of the inlet flow is measured by a pressure transducer, such as the off-valve pressure sensor 712 positioned downstream from the regulator on the gas supply line.

Then, based on the first value of the operating parameter, the consumable can be identified (1010). For example, a lookup table that correlates one or more consumables with respective values of one or more operating parameters can be used to identify the consumable based on the first value of the operating parameter. For example, the lookup table 1300 as discussed above can be used to identify a consumable installed in the torch.

In some cases, the method 1000 also includes manipulating (e.g., opening) the vent valve to permit the outlet flow of the gas from the plasma chamber through the vent line after the criterion is reached (e.g., to produce the gas stream G2) and determining a second value of the operating parameter. Then, the first value and the second value of the observed operating parameter can be used to identify the consumable. For example, in some embodiments, the vent valve can be first closed so that substantially only the gas stream G1 exits the torch and pressure can build within the plasma plenum to the threshold pressure value (e.g., 4 psig) by adjusting a supply pressure regulator (e.g., regulator 710). With the criterion reached (i.e., the threshold pressure value reached within the vent passage line and the plasma plenum) and the first value of the plasma gas flow or the off-valve pressure (e.g., as measured by the pressure sensor 712) determined, the vent valve can be manipulated (e.g., partially or fully opened) so that the downstream vent region becomes exposed to atmospheric pressure and thereby produces the gas stream G2.

With the vent valve opened, a second value of the operating parameter can be measured. That is, when the vent valve is opened and both the gas streams G1 and G2 are being expelled from the torch, the various operating parameters (e.g., the supply pressure of the inlet flow, the flow rate of the inlet flow, the off-valve pressure of the inlet flow, or the flow rate of an outlet flow (e.g., G1 and/or G2)) are expected to change as a result of the additional gas flows. Therefore, the second value of the operating parameter and/or the difference or other change between the first and second values can be used to identify the consumable disposed within the torch, for example, using a lookup table.

In some cases, the consumable can be a nozzle having at least one metering hole of a unique dimension for a given nozzle design. That is, different nozzle designs (e.g., nozzles designed for different material types or current values) can include differently sized metering holes, which can be determined using these methods. For example, a particular product line of nozzle, for example an entire line of gouging nozzles, piercing nozzles, or fine cut nozzles can all include the same configuration (e.g., the same size) metering holes.

Figure 11:
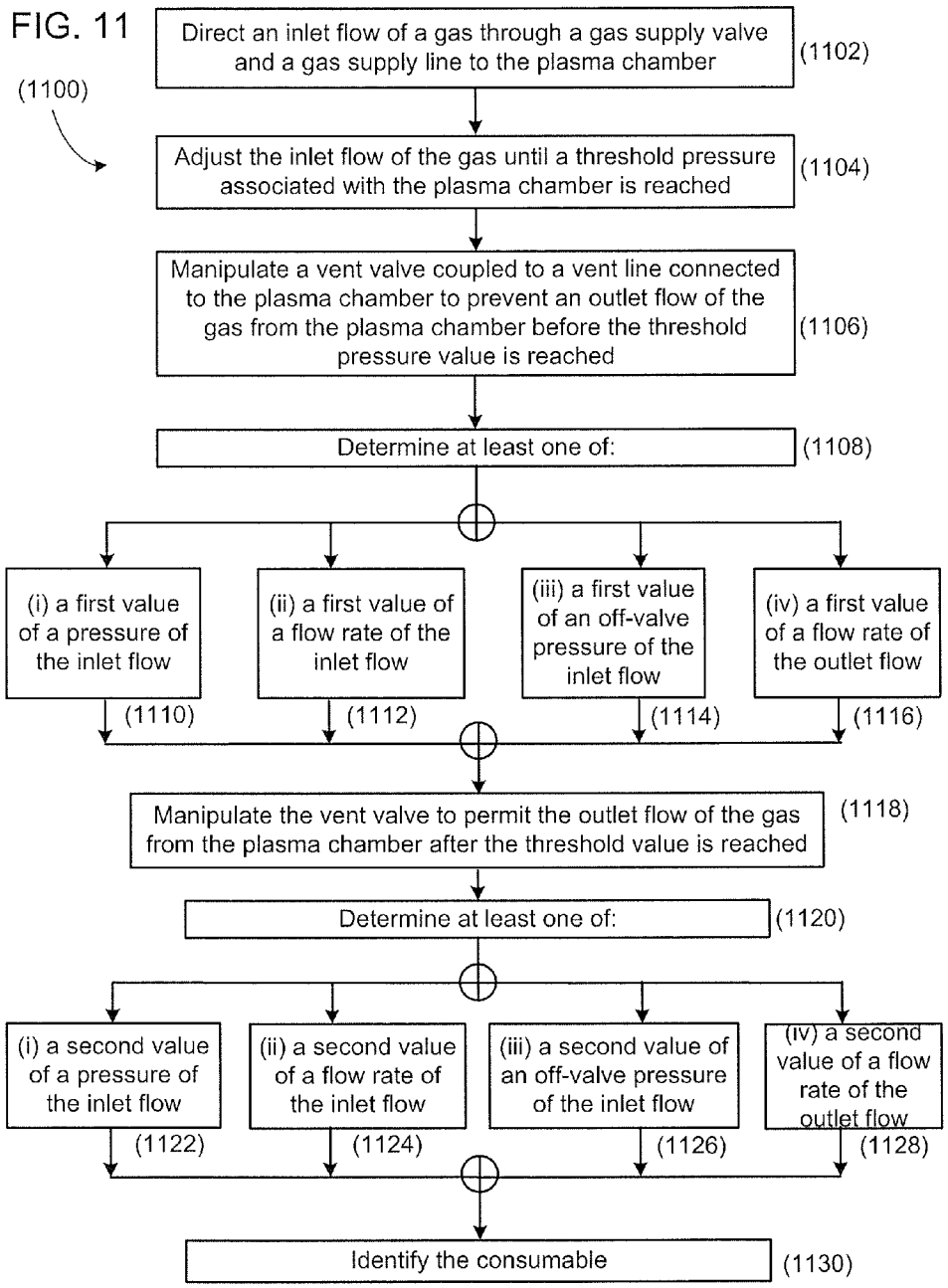
FIG. 11 is a flow chart illustrating another exemplary method for identifying a consumable component of a thermal processing torch by measuring gas flow changes through a feature of the consumable component.

Additionally, in some aspects, another example method (1100), as shown in FIG. 11, can be implemented for identifying a consumable, such as a nozzle or a swirl ring, of a thermal processing torch having a plasma chamber defined by an electrode and a nozzle.

First, an inlet flow of a gas can be directed through a gas supply valve (e.g., the supply off-valve 704) and a gas supply line to the plasma chamber of the torch (1102). For example, in some embodiments, the gas supply line can include a regulator (e.g., the regulator 710) and a plasma off-valve (e.g., the off-valve 704) coupled thereto to deliver gas to the torch.

Next, the inlet flow of the gas can be adjusted until a threshold pressure associated with the plasma chamber is reached (1104). For example, the regulator can be adjusted to change the pressure within the plasma chamber. In some embodiments, the threshold pressure is a pressure of about 4.0 pound per square inch (psig) in the plasma chamber. As discussed above, a vent valve (e.g., the vent off valve 716) coupled to a vent line connected to the plasma chamber can be manipulated (e.g., adjusted) to limit or prevent an outlet flow of the gas from the plasma chamber before the threshold pressure value is reached (1106). For example, in some cases, the vent valve can be closed (eliminating the gas stream G2) so that pressure can build within the plasma plenum and the threshold can be reached.

Once the threshold pressure is reached, a flow characteristic can be determined (1108). For example, in some embodiments, at least one of: (i) a first value of a pressure of the inlet flow (e.g., as measured by the pressure sensor 706) (1110); (ii) a first value of a flow rate of the inlet flow (e.g., as measured by flow detector 708) (1112); (iii) a first value of an off-valve pressure of the inlet flow (e.g., as measured by the off-valve pressure sensor 712) (1114); or (iv) a first value of a flow rate of the outlet flow (e.g., as measured by the vent flow detector 718) (1116) can be determined.

After the first value of the flow characteristic is determined, the vent valve can be adjusted (e.g., manipulated) to permit the outlet flow of the gas from the plasma chamber (1118). For example, in some embodiments, after the threshold value has been reached and the flow characteristic has been measured, the vent valve can be opened (e.g., partially or fully opened) to permit an outlet flow of gas from the plasma chamber (e.g., through the flow restriction element and downstream of the flow restriction element out of the vent passage). That is, opening the vent valve can cause the torch to begin expelling the gas stream G2 from the torch. In some cases, adjusting (e.g., manipulating) the vent valve to permit the outlet flow of the gas from the plasma chamber is performed prior to ignition of the torch.

The opening of the vent valve is expected to alter the flow characteristics of the torch system based on some of the gas entering the torch being expelled as the gas stream G2. Therefore, with the outlet flow of gas from the plasma chamber, at least one of various flow characteristics can be determined (e.g., re-measured) (1120). For example, at least one of: (i) a second value of the pressure of the inlet flow (1122), (ii) a second value of the flow rate of the inlet flow (1124), (iii) a second value of the off-value pressure of the inlet flow (1126), or (iv) a second value of the flow rate of the outlet flow (1128) can be determined.

Then, using the first and/or second values of the measured flow characteristics, the consumable can be identified (1130). For example, the measured flow characteristics can be referenced to a lookup table (e.g., the lookup table 1300, as shown in FIG. 12).

Additionally, one or more of the steps or features of the various methods described herein can be implemented in a variety of combinations with one another for identifying torch consumables.

While many of the systems and methods herein (e.g., the method 900, the method 1000, and the method 1100) have generally been described and illustrated as being used and implemented primarily in association with plasma arc torches, they can also be implemented with other material processing systems, such as water-jet systems. For example, during use, fluids, such as gases or liquids (e.g., water) can be directed to one or more components of a water-jet cutting system, such as a water-jet orifice, a mixing tube used to mix abrasive particles with fluid, and/or one or more high pressure cylinders or pump components to generate the high velocity water flow used to cut material. As with the plasma arc torches discussed above, the fluids can be directed through one or more of these components in accordance with the methods described herein to identify the consumables installed in the water-jet system. For example, fluid pressure and/or flow rate can be monitored upstream and downstream of the water-jet orifice to identify the type of orifice installed in the system.

In some aspects, a liquid jet cutting system (e.g., a water jet cutting system) can automatically identify system components (e.g., consumable components) and extract performance information related to the components by processing signals transmitted by one or more signal devices assigned to the components.

Figure 13:
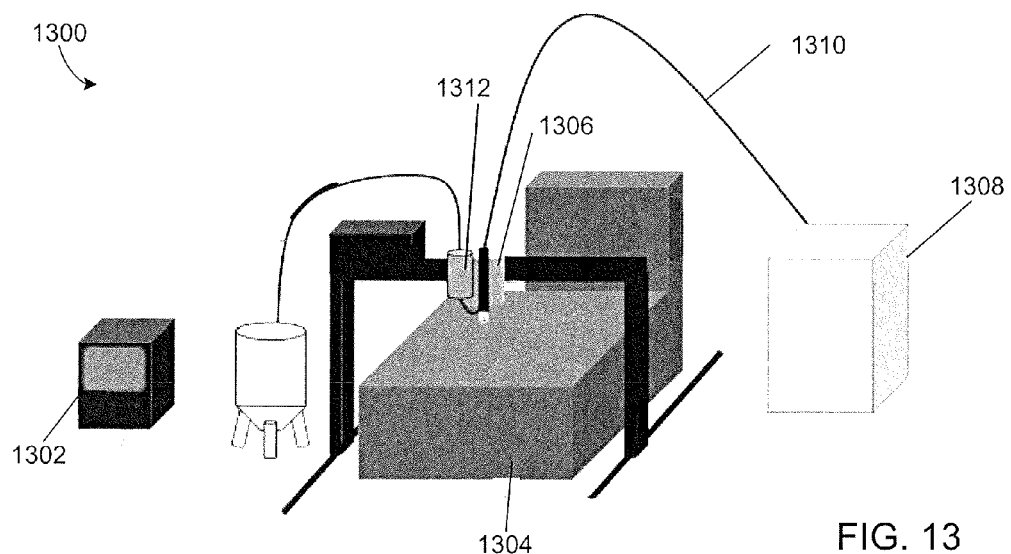
FIG. 13 is an exemplary liquid jet cutting system.

FIG. 13 shows an exemplary liquid jet cutting system 1300 that includes a computer numerical controller (CNC) 1302, a positioning device 1304, a cutting head 1306, a high-pressure pump 1308, a high pressure tubing 1310 and an optional abrasive delivery system 1312. The CNC 1302 is configured to automate and optimize a cutting operation. It serves as an operator's interface with the cutting system 1300 and can include hardware and/or software to enable cutting parameter and pump setting adjustments. The CNC 1302 also controls the motion of the positioning device 1304 (e.g., a XYZ cutting table, robotics, conveyor system, etc.) that is configured to position a workpiece and/or the cutting head 1306 for precise cutting. The abrasive delivery system 1312 can interact with the CNC 1302 to meter a precise amount of abrasive for injection into the liquid jet stream.

The high-pressure pump 1308 is configured to generate an ultra-high pressure liquid flow for delivery to the cutting head 1306 via the high-pressure tubing 1310. To achieve a high pressure, the high-pressure pump 1308 can include an intensifier (not shown) comprising a dual-head reciprocating pump typically driven by the output from a hydraulic pump. In this arrangement, hydraulic fluid is cyclically applied to opposed sides of a relatively large diameter "piston" where the piston has attached to it first and second oppositely directed plungers of relatively smaller diameter and that fit within oppositely directed cylinders. In operation, during a pressure stroke in one cylinder, water is drawn through a low pressure poppet into the other cylinder during its suction stroke. Thus, as the hydraulic piston and plunger assembly reciprocates back and forth, it delivers high pressure water out of one side of the intensifier while low pressure water fills the opposite side. In some embodiments, an attenuator or an accumulator (not shown) is fluidly coupled to the intensifier to buffer out pressure fluctuation caused by the reversal of the intensifier.

Figure 14:
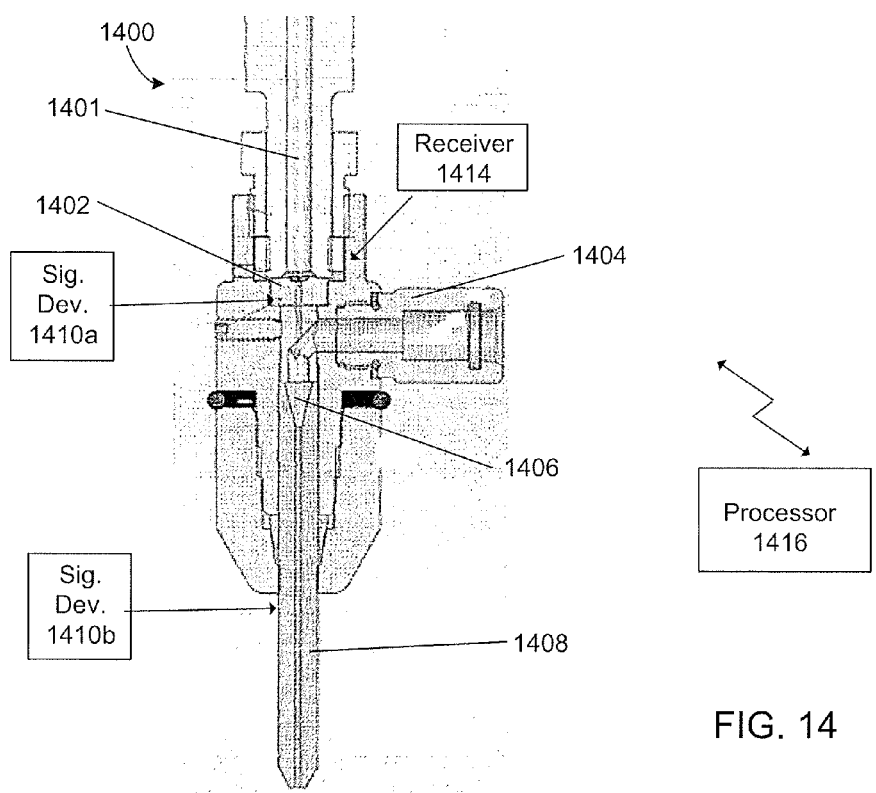
FIG. 14 shows an exemplary configuration of the cutting head of the liquid jet cutting system of FIG. 13 that includes a communication network.

FIG. 14 shows an exemplary configuration of the cutting head 1306 of the liquid jet cutting system 1300 of FIG. 13 that includes a communication network. In general, the cutting head 1400 of FIG. 14 serves several functions, including but not limited to creating a high velocity jet of liquid capable of cutting, providing a conduit for introducing a liquid jet to a workpiece, introducing additive(s) to the liquid jet, and centering the liquid jet for precise, accurate positioning in relation to the workpiece. As shown, the cutting head 1400 includes an orifice assembly 1402 (or "orifice" as these terms are interchangeable herein) for receiving high pressure liquid from the pump 1308 via the inlet 1401 and allowing the liquid to exit from a small opening at supersonic speed. The size of the orifice opening varies depending on the material property and thickness of the workpiece being cut and is usually between 0.003 to 0.025 inch. The orifice assembly 1402 can include an orifice gem (not shown), an orifice holder (not shown), and an orifice retainer (not shown). The cutting head 1400 also includes an abrasive inlet 1404 for introducing an abrasive for mixing with the fluid from the orifice assembly 1402, where the mixing of the fluid and the abrasive can take place at a mixing chamber 1406 of the cutting head 1400 situated below the orifice assembly 1402. In operation, a liquid jet from the orifice assembly 1402 is adapted to move quickly through the mixing chamber 1406 such that a Venturi effect can be created, where the liquid pulls the abrasive into itself. The cutting head 1400 further includes a nozzle 1408 for receiving the liquid from the chamber 1406. The nozzle 1408 can function as a mixing tube by providing an elongated space (e.g., 3 to 4 inches) for the liquid and abrasive to mix prior to reaching the workpiece. Thus, the orifice assembly 1402 and the nozzle 1408 define at least a portion of the conduit for receiving the liquid jet and introducing the liquid jet to a workpiece. The orifice assembly 1402, the nozzle 1404 and the mixing chamber 1406 can be consumable components as they are subject to erosion by the liquid passing therethrough and therefore need to be replaced periodically.

FIG. 14 also shows a communication network associated with the cutting head 1400. The communication network includes one or more signal devices 1410 (e.g., 1410a and 1410b), each assigned to a consumable component of the cutting head 1400 (e.g., the orifice assembly 1402 and the nozzle 1408). For example, signal device 1410a can be assigned to the orifice assembly 1402 and signal device 1410b can be assigned to the nozzle 1408. Each signal device 1410 can transmit a signal associated with the consumable component to a receiver 1414. Each signal device 1410 can be an electrically writable device configured to transmit information about the respective consumable in the form of one or more signals. Each signal device 1410 can be substantially the same as the signal devices 202 of FIG. 2. For example, each signal device 1410 can be a radio-frequency identification (RFID) tag or card, bar code label or tag, integrated circuit (IC) plate, or the like. In some embodiments, a signal device 1410 is a detector (e.g., a sensor) for detecting a physical characteristic of the consumable and transmitting the detected information in the form of one or more signals. The communication network also includes at least one receiver 1414 for i) receiving signals transmitted by at least one of the signal devices 1410, ii) extracting data conveyed by the signals, iii) providing the extracted data to a processor 1416 for analysis and further action and (iv) writing data to one or more of the signal devices as instructed by the processor 1416. The processor 1416 can be a digital signal processor (DSP), microprocessor, microcontroller, computer, computer numeric controller (CNC) machine tool, programmable logic controller (PLC), application-specific integrated circuit (ASIC), or the like. The processor can be integrated with the CNC 1302 or can be a stand-alone computing device.

In some embodiments, each signal device 1410 is encoded with information pertaining to the consumable to which the signal device 1410 is assigned. The encoded information can be generic or fixed information such as the consumable's name, trademark, manufacturer, serial number, and/or type. The encoded information, for example, can include a model number to generally indicate the type of the consumable, such that the consumable is an orifice assembly or a nozzle. In some embodiments, the encoded information is unique to the consumable, such as material composition of the consumable, weight and/or size of opening of the consumable, date, time and/or location at which the consumable was manufactured, personnel responsible for the consumable, and the like. As an example, the encoded information can provide a serial number, which is unique to each consumable component manufactured, to distinguish, for example, nozzle Type A, Serial #1 from nozzle Type A, Serial #2. As another example, the signal device 1410a can store information related to the opening size of the orifice assembly 1402 and the signal device 1410b can store information related to the opening size of the nozzle 1408. Generally, information encoded in each signal device 1414 can be substantially similar to the information encoded in the signal devices 202 of FIG. 2.

In some embodiments, information is encoded to a signal device 1410 at the time of manufacture of the corresponding consumable. Information can also be encoded to a signal device 1410 during the lifetime of the consumable, such as after each consumable use. Encoded information can include the date, time, duration, and location of consumable use, any abnormalities detected during use, and/or consumable conditions after use so that a log can be created to predict a failure event or end-of-life time frame associated with the consumable. Recorded information can also include the number of pressure cycles the consumable has been exposed to or can be exposed to. As an example, the signal device 1410a can track the number of hours of operation of the orifice assembly 1402 and thus allow the processor 1416 to determine or predict when the orifice assembly 1402 exceeds warranty or approach end of life. Similarly, the signal device 1410b can track usage of the nozzle 1408 to predict warranty expiration and/or end of life time frame.

Information encoded to a signal device 1410 can also specify operating parameters and/or instructions that allow the processor 1416 to automatically configure at least one operating parameter of the liquid jet cutting system 1300. As an example, due to the use of abrasive in the liquid jet, the opening of the nozzle 1408 may grow with time, thus affecting quality of cutting operations. Therefore, the signal device 1410b associated with the nozzle 1408 can store the size of the opening of the nozzle 1408, thus allowing the processor 1416 to predict its growth and automatically adjust certain operating parameters, such as the kerf setting, to compensate for the predicted growth. As another example, the size of the opening of the orifice assembly 1402 is correlated to the stroke rate of the pump 1308 that creates a stream of high pressure liquid. Hence, the processor 1416 can use the orifice size information stored in the signal device 1410a to predict the pump stroke rate. For example, the processor 1416 can use the predicted stroke rate to diagnose the health of the pump 1308 by comparing the predicted stroke rate to the actual stroke rate measured. If the actual stroke rate is faster than the predicted rate, it can indicate any number of adverse conditions, including but not limited to, a high pressure leak, a blown orifice, bleed down valve failure, poppet leak or failure, accumulator leak, and/or internal check valve failure. For example, a high pressure leak, blown orifice, bleed down valve failure, or leak in the accumulator can cause the intensifier to stroke too quickly in both directions. A poppet leak or failure can cause the intensifier to stroke too quickly in one direction. In general, poppets can fail from debris preventing closure, excessive lubrication of parts resulting in contamination, and/or wear. In other examples, information stored on each or both of the signal devices 1410 can be used by the processor 1416 to perform the following adjustments: (i) adjust the composition/amount of additives into the liquid jet by interacting with the abrasive delivery system 1312, (ii) adjust the positioning of the workpiece in relation to the cutting head 1306 by adjusting the positioning device 1304, and/or (iii) change the stroke rate of the pump 1308. In some embodiments, the combination of information stored in the signal devices 1410 allows the processor 1416 to set up one or more of the cutting parameters automatically so as to optimize the efficiency and maximize the lifespan of the nozzle 1408 and/or orifice assembly 1402.

In some embodiments, encoded data of signal devices 1410 provides information about other related system components. For example, encoded data can identify other system components that are compatible with the assigned consumables, thereby assisting with the installation of the entire consumable set in a liquid jet cutting system to achieve certain performance metrics. For example, the processor 1416 can use orifice-related information stored in signal device 1410a or nozzle-related information stored in signal device 1410b to select the appropriate type of pump 1308 that creates a cutting jet of sufficiently high pressure or to select an appropriate type of abrasive to introduce to the jet stream. The processor 1416 can also use orifice-related information stored in signal device 1410a to select the appropriate type of nozzle 1408 or vice versa.

In some embodiments, a signal device 1410 is writable once, for example, to encode information about a consumable when the consumable is first manufactured. In some embodiments, a signal device 1410 is writable multiple times, such as throughout the lifespan of the corresponding consumable.

In some embodiments, each of the signal devices 1410 is located inside of the cutting head 1400 (e.g., on an interior surface of the cutting head body) and/or on a consumable component of the cutting head 1400. For example, a signal device 1410 can be attached to a surface of a consumable that is ultimately installed inside of the cutting head 1400. A signal device 1410 can also be attached to a component inside of the cutting head 1400 other than the assigned consumable. In some embodiments, a signal device 1410 is coupled to an external source that is not physically associated with the cutting head 1400. For example, the signal device 1410 can be attached to a package used to store the consumable and is remote from the consumable once it is installed in the cutting head. In an exemplary configuration, the signal device 1410a for storing information about the orifice assembly 1402 is located on a surface of the orifice assembly 1402 (e.g., mounted on the surface of the orifice holder) while the signal device 1410b for storing information about the nozzle 1408 is located on the surface of the nozzle 1408. In addition, both signal devices 1410 can be placed in low pressure regions of the cutting head 1400 to minimize exposure to high pressure liquid during cut operations.

In some embodiments, a signal device 1410 is designed to be durable, i.e., functional during and after one or more cutting operations. For example, the signal device 1410a can be sufficiently robust to withstand ultrasonic cleaning of the orifice assembly 1402 to remove deposits. In some embodiments, certain cleaner is used to avoid harming the signal device 1410a. In some embodiments, a signal device 1410 is disposable after each cutting operation or after several operations.

Each of the signal devices 1410 can wirelessly transmit its stored information to the receiver 1414 in the form of one or more signals. In general, the receiver 1414 can be substantially similar to the receiver 204 of FIG. 2. The receiver 1414 is adapted to process signals from each signal device 1410 to extract pertinent data about the consumable corresponding to the signal device 1410 and forward the data to the processor 1416 for analysis. In some embodiments, the receiver 1414 is located in or on the cutting head 1400. For example, the receiver 1414 can be located in the cutting head 1400 close to the signal device 1410, such as on the body of the abrasive inlet 1404 and/or on an internal surface of the cutting head body. In some embodiments, the receiver 1404 is at a location external to the cutting head 1400, such as attached to the processor 1416. In some embodiments, the signal devices 1410 are RFID tags, in which case the receiver 1414 is a reader used to interrogate one or both of the RFID tags. Each of the reader and tag can include an antenna for receiving and transmitting signals. Another component in an RFID communication system is an interface board (e.g., a printed circuit board) that implements middleware application for connecting the data from a reader to an external host software system. The interface board can perform one or more of the following functions: retrieving data from one or more readers, filtering data feeds to external application software, monitoring tag and reader network performance, capturing history, and converting analog signals received from a reader to digital signals for external transmission. Yet another component in an RFID communication system is a connector configured to transmit the digital signal from the interface board to the external host software system. In some embodiments, one reader is used to interact with multiple RFID tags. Alternatively, multiple readers can be used, each interacting with a respective one of the RFID tags. In some embodiments, a single interface board is used to connect information from one or more readers to an external processor. Alternatively, multiple interface boards can be used to connect respective ones of readers to an external processor.

FIG. 15 shows an exemplary design of a cutting head for housing an RFID communication system, such as for the cutting head 1400 of FIG. 14. FIG. 15 shows a cylindrical housing 1502, sealed with one or more o-rings 1504, for housing an interface board 1506. The housing 1502 can be significantly circular at its cross section. One or more slots (not shown) can be drilled inside of the housing 1502 to hold the interface board 1506 in place. At least one nut 1522 can be used to connect the housing 1502 to the abrasive inlet of the cutting head body such that the housing 1502 is rotatable with respect to the cutting head body. In addition, a connector 1520, such as a Fisher© or Truck© connector, can be used to transmit data, in the form of analog signals for example, between the interface board 1506 and an external processor, such as the processor 1416 of FIG. 4 or the CNC 1302 of FIG. 13.

In addition, one or more wires 1508 are used to connect at least one reader 1510 to the interface board 1506. Each interface board 1506 can have multiple readers connected thereto. The wires 1508 are sufficiently long to route through the housing 1502 to reach the interface board 1506. At least one RFID tag 1512a is installed in the cutting head to store information about the orifice assembly 1514 and at least one additional RFID tag 1512b is used to store information about the nozzle 1516. The reader 1510 is adapted to communicate with one or both of the RFID tags via the antennas 1518. As shown in FIG. 15, each RFID tag 1512 has a dedicated antenna situated close by. Alternatively, a single antenna can be used for both RFID tags 1512. The reader 1510 can forward the stored information on the respective tags to the interface board 1506 via the wires 1508.

FIGS. 16a-c show another exemplary design of a cutting head for housing an RFID communication system, such as for the cutting head 1400 of FIG. 14. As shown, a box housing 1602, sealed with one or more gaskets 1604, is provided to house an interface board 1606. The housing 1602 can be significantly rectangular in profile, as more clearly shown in FIG. 16b. At least one hollow bolt (not shown) can be used to connect the housing 1602 to the cutting head body such that the housing 1602 is rotatable with respect to the cutting head body. In addition, one or more connectors 1620, such as dual coax connectors, can be used to transmit data in the form of digital signals between the interface board 1606 and an external processor. In some embodiments, if the interface board 1606 transmits analog signals, the top piece 1602a of the housing 1602 is non-conductive because the connectors 1620 are connected to the interface board 1606. In addition, the top piece 1602a can be sealed at the area where the housing 1602 touches the connectors 1620. One or more wires 1608 are used to connect at least one reader 1610 to the interface board 1606 through a channel in the body of the abrasive inlet. The placements of the RFID tags, readers and antennas in this design can be significantly the same as the design of FIG. 15.

Figures 17, 18:
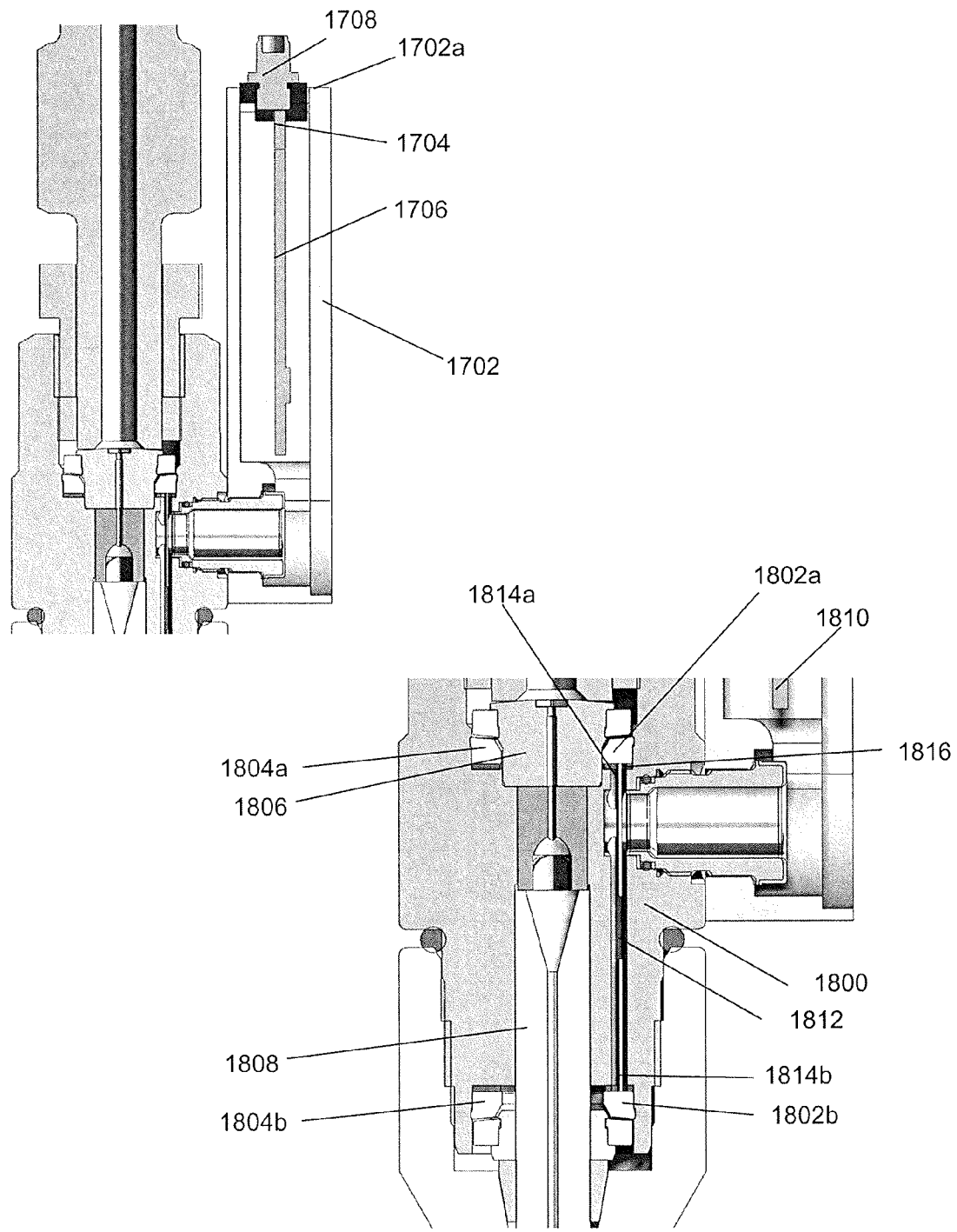
FIG. 17 is yet another exemplary design of a cutting head for housing an RFID communication system.
FIG. 18 is yet another exemplary design of a cutting head for housing an RFID communication system.

FIG. 17 shows yet another exemplary design of a cutting head for housing an RFID communication system, such as for the cutting head 1400 of FIG. 14. FIG. 17 can be substantially similar to the design of FIGS. 16a-c, except the housing 1702 includes both the interface board 1706 and the reader 1704. Hence, lengthy wires are not required to connect the reader 1704 to the interface board 1706. Another advantage is that the signals transmitted by the connector 1708 to an external processor are less susceptible to noise and thus more robust. This is because the interface board 1706 is adapted to convert analog signals received from a reader to digital signals within the cutting head, where the resulting digital signals transmitted are mostly immune to noise. In addition, the top piece 1702a of the housing 1702 no longer needs to be insulated for the same reason, since insulation is mostly useful for preventing conduction of electrical noise into analog signals. In some embodiments, the interface board 1506 of the cutting head design of FIG. 15 and/or the interface board 1606 of the cutting head design of FIGS. 16a-c are configured to transmit analog signals (i.e., without conversion to digital signals inside of the respective cutting heads). Even though this mode of transmission tends to more susceptible to external noise and thus requires insulation, the interface boards are typically smaller. However, in other embodiments, the interface boards 1506 and 1606 can be easily modified to convert analog reader signals to digital signals prior to transmission to an external processor.

FIGS. 15-17 show at least one reader in an RFID communication system for relaying information from RFID tags to one or more connectors via at least one interface board. In some embodiments, multiple readers can be used, each communicates with at least one RFID tag. In addition, a wire is used to connect each reader to the connectors. FIG. 18 shows an exemplary configuration of a cutting head, such as for the cutting head 1400 of FIG. 14, configured to accommodate wired connections between multiple readers and a connector. As shown, two readers are provided, the reader 1802a is configured to communicate with the RFID tag 1804a associated with the orifice assembly 1806 while the reader 1802b is configure to communicate with the RFID tag 1804b associated with the nozzle 1808. The readers 1802 can be situated at locations within the cutting head close to the respective tags 1804 while minimizing the distance (i.e., length of the wires used) between them and the connector (not shown) via the interface board 1810. As shown in FIG. 18, the reader 1802a is located between the orifice assembly 1806 and an internal surface of the cutting head body 1800 on a side closest to the board 1810. Similarly, the reader 1802b is located between the nozzle 1808 and an internal surface of the cutting head body 1800 on a side closest to the board 1810. In addition, a conduit 1812 is machined into the cutting head body 1800 to allow wires 1814 to be routed therethrough to reach the interface board 1810 and terminate at the connector. The wires 1814 include wires 1814a and 1814b for connecting the reader 1802a and 1802b to the board 1810, respectively. In some embodiments, the conduit 1812 is not milled. Instead, electrical discharge machining (EDM) is used to create this feature in the cutting head body 1800. In some embodiments, a gasket 1816, such as a flexible neoprene gasket, is squeeze-fit into the conduit 1812 to prevent water from seeping into the area where the tag and/or reader reside. The gasket 1816 can include an opening to allow the wires 1814 to pass therethrough while providing a waterproof seal.

Figure 19:
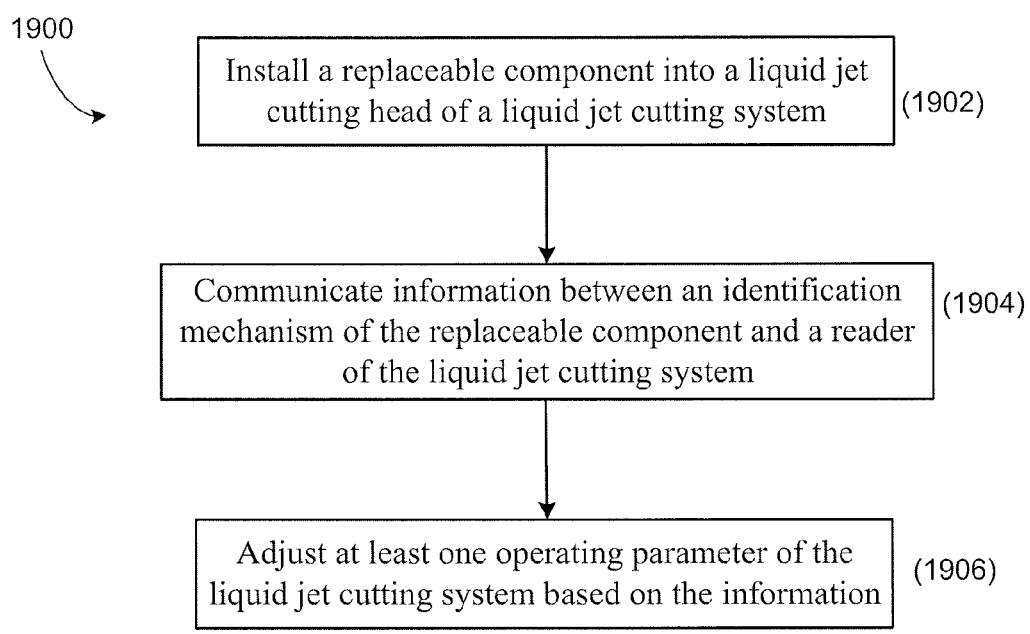
FIG. 19 is an exemplary process for operating the liquid jet system of FIG. 13.

FIG. 19 showing an exemplary process for operating the liquid jet system of FIG. 13. The process starts (at step 1902) when at least one replaceable component is installed into the cutting head of a liquid jet cutting system, such as into the cutting head 1306 of the system 1300. The replaceable components can be a consumable, such as a nozzle (e.g., the nozzle 1408) or a orifice assembly (e.g., the orifice assembly 1402) of the cutting head. At least one identification mechanism, such as a signal device (e.g., signal device 1410) in the form of an RFID tag, is assigned to the replaceable component. The identification mechanism can be attached to a surface of the replaceable component. The identification mechanism is adapted to communicate (at step 1904) information about its assigned replaceable component to a reader (e.g., the receiver 1414) of the liquid jet cutting system. Exemplary information includes the type of the replaceable component, time or duration of use of the component and/or condition of component use. The reader can forward the information to a processor (e.g., the processor 1416 and/or CNC 1302) via an interface board (e.g., the board 1506) and a connector (e.g., the connector 1520). In response, the processor (at step 1906) can automatically adjust at least one operating parameter of the cutting system based on the received information. For example, the processor can use the received information to determine a period of use of the replaceable component, a predict life expectancy of the component, a predicted stroke rate of the pump of the liquid jet cutting system and/or a kerf setting for cutting a workpiece. An exemplary adjustment by the processor can include outputting an alarm signal or message to warn an operator about an approaching end of life event, a potential leak (after comparing the predicted stroke rate with an actual stroke rate) and/or a poppet failure based on the predicted stroke rate. The processor can also automatically adjust the system to implement a new kerf setting.

It should also be understood that various aspects and embodiments of the invention can be combined in various ways. Based on the teachings of this specification, a person of ordinary skill in the art can readily determine how to combine these various embodiments. In addition, modifications may occur to those skilled in the art upon reading the specification. The present application includes such modifications and is limited only by the scope of the claims.

What is claimed is:

1. A liquid jet cutting system, comprising:
   at least one reader;
   a pump;
   a cutting head fluidly connected to the pump, the cutting head comprising:
      a cutting head body;
      a plurality of replaceable components connected to the cutting head body and defining at least a portion of a conduit for receiving a liquid jet;
      a plurality of signal devices assigned to respective ones of the plurality of replaceable components, wherein the plurality of signal devices are configured to communicate to the at least one reader information associated with the corresponding replaceable components;
      a plurality of readers disposed on the cutting head body for communicating with the plurality of signal devices about the information associated with the corresponding replaceable components; and
      a connector communicatively coupled to the plurality of readers, the connector being configured to transmit the information from the plurality of readers to a CNC or a PLC; and
   a computing device communicatively coupled to the at least one reader for receiving the information from the reader.

2. The liquid jet cutting system of claim 1, wherein the computing device comprises at least one of a computer numerical controller (CNC) or a pump programmable logic controller (PLC).

3. The liquid jet cutting system of claim 1, wherein the computing device is configured to automatically adjust at least one operating parameter of the liquid jet cutting system at least in part based on the information received from the at least one reader.

4. The liquid jet cutting system of claim 3, wherein the at least one operating parameter comprises a kerf setting.

5. The liquid jet cutting system of claim 1, wherein the computing device is configured to automatically determine the identities of the plurality of replaceable components at least in part based on the information received from the reader.

6. The liquid jet cutting system of claim 1, wherein the plurality of replaceable components comprise a nozzle and an orifice of the liquid jet cutting system.

7. The liquid jet cutting system of claim 6, wherein the plurality of signal devices comprise a first signal device disposed on the nozzle and a second signal device disposed on the orifice.

8. The liquid jet cutting system of claim 6, wherein the information identifies at least one of a type of the nozzle or a type of the orifice.

9. The liquid jet cutting system of claim 1, wherein the information comprises at least one of a time or duration of use of the corresponding replaceable components.

10. The liquid jet cutting system of claim 1, wherein at least one of the plurality of signal devices comprises an RFID tag.

11. The liquid jet cutting system of claim 1, wherein the cutting head further comprises a high pressure liquid inlet.

12. The liquid jet cutting system of claim 1, wherein the cutting head further comprises an abrasive inlet.

13. The liquid jet cutting system of claim 1, further comprising a plurality of wires connected to the plurality of readers, wherein the plurality of wires are disposed within the cutting head body.

14. The liquid jet cutting system of claim 1, wherein the connector is further configured to convert the information in the form of an analog signal to a digital signal.

15. The liquid jet cutting system of claim 1, further comprising an intensifier associated with the pump.

16. The liquid jet cutting system of claim 15, further comprising an accumulator fluidly connected to the pump.

17. A method for operating a liquid jet cutting system, the method comprising:
installing a replaceable component into a liquid jet cutting head of the liquid jet cutting system, the replaceable component including an identification mechanism;
communicating information between the identification mechanism and a reader of the liquid jet cutting system;
determining, based on the information communicated, at least one of (i) a period of use of the replaceable component, (ii) a predicted life expectancy of replaceable component, (iii) a predicted stroke rate for the pump, or (iv) a kerf setting for the liquid let cutting system; and
adjusting at least one operating parameter of the liquid jet cutting system to implement a new use setting based on the information.

18. The method of claim 17, wherein the replacement component is one of a nozzle or an orifice.

19. The method of claim 18, wherein the information identifies a type of the nozzle or the orifice.

20. The method of claim 17, wherein the information comprises at least one of a time or duration of use of the replaceable component.

21. The method of claim 17, wherein the information comprises at least one of a condition of use of the replaceable component.

22. The method of claim 17, wherein the at least one operating parameter comprises a cutting parameter that is automatically adjusted based on the information communicated.

23. The method of claim 17, further comprising detecting a system leak by comparing the predicted stroke rate to an actual stroke rate.

24. The method of claim 17, further comprising detecting a poppet failure by analyzing the predicted stroke rate.

25. A liquid jet cutting system, comprising:
at least one reader;
a pump;
a cutting head fluidly connected to the pump, the cutting head comprising:
a cutting head body;
a plurality of replaceable components connected to the cutting head body and defining at least a portion of a conduit for receiving a liquid jet, the plurality of replaceable components comprising a nozzle and an orifice of the liquid jet cutting system; and
a plurality of signal devices assigned to respective ones of the plurality of replaceable components, wherein the plurality of signal devices are configured to communicate to the at least one reader information associated with the corresponding replaceable components, the plurality of signal devices comprising a first signal device disposed on the nozzle and a second signal device disposed on the orifice; and
a computing device communicatively coupled to the at least one reader for receiving the information from the reader.

26. The liquid jet cutting system of claim 25, wherein the computing device is configured to automatically adjust at least one operating parameter of the liquid jet cutting system at least in part based on the information received from the at least one reader.

27. The liquid jet cutting system of claim 25, wherein the computing device is configured to automatically determine the identities of the plurality of replaceable components at least in part based on the information received from the reader.

28. The liquid jet cutting system of claim 25, wherein at least one of the plurality of signal devices comprises an RFID tag.

* * * * *